United States Patent
Lee et al.

(10) Patent No.: US 12,489,138 B2
(45) Date of Patent: *Dec. 2, 2025

(54) INTERMEDIATE PRODUCT OF SOLID ELECTROLYTE, SOLID ELECTROLYTE USING SAME, SECONDARY BATTERY INCLUDING SAME, AND METHOD FOR MANUFACTURING SAME

(71) Applicant: INDUSTRY-UNIVERSITY COOPERATION FOUNDATION HANYANG UNIVERSITY ERICA CAMPUS, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: INDUSTRY-UNIVERSITY COOPERATION FOUNDATION HANYANG UNIVERSITY ERICA CAMPUS, Anan-Si (KR)

(*) Notice: Subject to any disclaimer, the term of this patent is extended or adjusted under 35 U.S.C. 154(b) by 771 days.

This patent is subject to a terminal disclaimer.

(21) Appl. No.: 17/659,369

(22) Filed: Apr. 15, 2022

(65) Prior Publication Data
US 2022/0294003 A1 Sep. 15, 2022

Related U.S. Application Data

(63) Continuation of application No. PCT/KR2020/014077, filed on Oct. 15, 2020.

(30) Foreign Application Priority Data

Oct. 15, 2019 (KR) .......................... 10-2019-0127836

(51) Int. Cl.
*H01M 10/056* (2010.01)
*C07D 277/22* (2006.01)
(Continued)

(52) U.S. Cl.
CPC ........ *H01M 10/056* (2013.01); *C07D 277/22* (2013.01); *C07D 333/10* (2013.01);
(Continued)

(58) Field of Classification Search
CPC ............. H01M 10/056; H01M 10/052; H01M 4/0407; H01M 4/405; H01M 4/5805; H01M 2300/0065; C07D 277/22; C07D 333/10
See application file for complete search history.

(56) References Cited

U.S. PATENT DOCUMENTS 6,558,848 B1  5/2003  Kobayashi et al.
6,794,087 B2  9/2004  Choi
(Continued)

FOREIGN PATENT DOCUMENTS

CN  1143839 A  2/1997
CN  1329373 A  1/2002
(Continued)

OTHER PUBLICATIONS

English Translation of KR20060025515A—Ionic Liquids containing a sulfonate anion; Mar. 21, 2006 (Year: 2006).*
(Continued)

Primary Examiner — Adam J Francis
(74) Attorney, Agent, or Firm — Finch & Maloney PLLC

(57) ABSTRACT

Provided is an intermediate product of a solid electrolyte. The intermediate product of a solid electrolyte may comprise: a compound in which a cation including thiophenium
(Continued)

or thiazolium and an anion including fluorohydrogenate are bound, and a solvent in which the compound is mixed.

8 Claims, 15 Drawing Sheets

(51) Int. Cl.
*C07D 333/10* (2006.01)
*H01M 4/04* (2006.01)
*H01M 4/40* (2006.01)
*H01M 4/58* (2010.01)
*H01M 10/052* (2010.01)

(52) U.S. Cl.
CPC ......... *H01M 4/0407* (2013.01); *H01M 4/405* (2013.01); *H01M 4/5805* (2013.01); *H01M 10/052* (2013.01); *H01M 2300/0065* (2013.01)

(56) References Cited

U.S. PATENT DOCUMENTS

| | | |
|---|---|---|
| 9,735,418 B2 | 8/2017 | Woo et al. |
| 10,283,762 B2 | 5/2019 | Hong et al. |
| 10,333,135 B2 | 6/2019 | Paulsen et al. |
| 10,707,481 B2 | 7/2020 | Lee et al. |
| 10,734,642 B2 | 8/2020 | Zhamu et al. |
| 10,858,749 B2 | 12/2020 | Park et al. |
| 11,021,367 B2 | 6/2021 | Kang et al. |
| 11,316,145 B2 | 4/2022 | Woo et al. |
| 2004/0042954 A1 | 3/2004 | Park et al. |
| 2009/0269677 A1 | 10/2009 | Hirose et al. |
| 2010/0323247 A1 | 12/2010 | Takeshi et al. |
| 2011/0070500 A1 | 3/2011 | Chen et al. |
| 2012/0043530 A1* | 2/2012 | Badre ............... H10K 85/1135 257/E51.026 |
| 2012/0315550 A1 | 12/2012 | Liu et al. |
| 2013/0149227 A1 | 6/2013 | Chon et al. |
| 2013/0164611 A1 | 6/2013 | Nanba et al. |
| 2014/0170303 A1 | 6/2014 | Rayner et al. |
| 2014/0349187 A1 | 11/2014 | Hirose et al. |
| 2014/0377653 A1 | 12/2014 | Park et al. |
| 2015/0037689 A1 | 2/2015 | Nishimura et al. |
| 2016/0301008 A1 | 10/2016 | Mitchell et al. |
| 2017/0117538 A1 | 4/2017 | Bendimerad et al. |
| 2017/0187066 A1 | 6/2017 | Tsujimura et al. |
| 2017/0204241 A1* | 7/2017 | Nicolay ............. H01M 10/052 |
| 2017/0244098 A1 | 8/2017 | Duong et al. |
| 2018/0034038 A1 | 2/2018 | Rogren |
| 2018/0190977 A1 | 7/2018 | Park et al. |
| 2018/0241032 A1 | 8/2018 | Pan et al. |
| 2018/0358654 A1 | 12/2018 | Forsyth et al. |
| 2019/0027781 A1 | 1/2019 | Lee et al. |
| 2019/0088986 A1 | 3/2019 | Hu et al. |
| 2019/0379088 A1 | 12/2019 | Schmidt et al. |
| 2020/0235427 A1* | 7/2020 | Kim ..................... H01M 4/624 |
| 2022/0158171 A1 | 5/2022 | Ryu et al. |

FOREIGN PATENT DOCUMENTS

| | | |
|---|---|---|
| CN | 101567462 A | 10/2009 |
| CN | 103887477 A | 6/2014 |
| CN | 105762342 A | 7/2016 |
| CN | 107180967 A | 9/2017 |
| CN | 107834044 A | 3/2018 |
| CN | 108028371 A | 5/2018 |
| CN | 109192965 A | 1/2019 |
| EP | 3783679 A1 | 2/2021 |
| JP | 08-021388 B | 3/1996 |
| JP | 09-265976 A | 10/1997 |
| JP | 2005251466 A * | 9/2005 ............. H01M 8/02 |
| JP | 2010111597 A * | 5/2010 |
| JP | 2016-189321 A | 11/2016 |
| JP | 2018-516435 A | 6/2018 |
| KR | 10-2003-0030818 A | 4/2003 |
| KR | 20060025515 A * | 3/2006 |
| KR | 10-2012-0022629 A | 3/2012 |
| KR | 10-2012-0113685 A | 10/2012 |
| KR | 10-2013-0114097 A | 10/2013 |
| KR | 10-2014-0046611 A | 4/2014 |
| KR | 10-2014-0144590 A | 12/2014 |
| KR | 10-2014-0148384 A | 12/2014 |
| KR | 10-1573423 B1 | 12/2015 |
| KR | 10-2016-0062617 A | 6/2016 |
| KR | 10-2016-0091981 A | 8/2016 |
| KR | 10-1681739 B1 | 12/2016 |
| KR | 10-2017-0077014 A | 7/2017 |
| KR | 10-2017-0081196 A | 7/2017 |
| KR | 10-1788232 B1 | 10/2017 |
| KR | 10-1808373 B1 | 12/2017 |
| KR | 10-2018-0015841 A | 2/2018 |
| KR | 10-2018-0102554 A | 9/2018 |
| KR | 10-2018-0116137 A | 10/2018 |
| KR | 10-2019-0003940 A | 1/2019 |
| KR | 10-2019-0010250 A | 1/2019 |
| KR | 10-2019-0042089 A | 4/2019 |
| KR | 10-2019-0120725 A | 10/2019 |
| WO | 2001/029912 A1 | 4/2001 |
| WO | 2015/080302 A1 | 6/2015 |
| WO | 2018025036 A1 | 2/2018 |
| WO | WO2019031766 A2 | 2/2019 |
| WO | WO-2019188358 A1 * | 10/2019 ............. H01M 10/05 |

OTHER PUBLICATIONS

Orita et al., "Application of sulfonium-, thiophenium-, and thioxonium-based salts as electric double-layer capacitor electrolytes", Journal of Power Sources, vol. 195, No. 19, pp. 6970-6976 (2010).
Taniki et al., "Effects of HF content in the (FH)n F-anion on the formation of ionic plastic crystal phases of N-ethyl-N-methylpyrrolidinium and N,N-dimethylpyrrolidinium fluorohydrogenate salts", Physical Chemistry Chemical Physics, vol. 16, No. 4, pp. 1522-1528 (2014).
U.S. Appl. No. 17/659,370 (English translation of originally-filed application papers), application filing date Apr. 15, 2022 (99 pages).
U.S. Appl. No. 17/659,371 (English translation of originally-filed application papers), application filing date Apr. 15, 2022 (101 pages).
U.S. Appl. No. 17/659,374 (English translation of originally-filed application papers), application filing date Apr. 15, 2022 (110 pages).
International Search Report for International Application No. PCT/KR2020/014077 mailed Jan. 18, 2021, 3 pages.
Written Opinion of the International Searching Authority for International Application No. PCT/KR2020/014077 mailed Jan. 18, 2021, 9 pages.
Liu et al., "Unique 3D nanoporous/macroporous structure Cu current collector for dendrite-free lithium deposition", Energy Storage Materials, vol. 17, pp. 253-259 (Feb. 2019).
Mei et al., "Triple carbon coated LiFePO4 composite with hierarchical conductive architecture as high-performance cathode for Li-ion batteries", Electrochimica Acta 153, pp. 523-530 (2015).
Zhou et al., "Graphene modified LiFePO4 cathode materials for high power lithium ion batteries", J. Mater. Chem., 21, pp. 3353-3358 (2011).

* cited by examiner

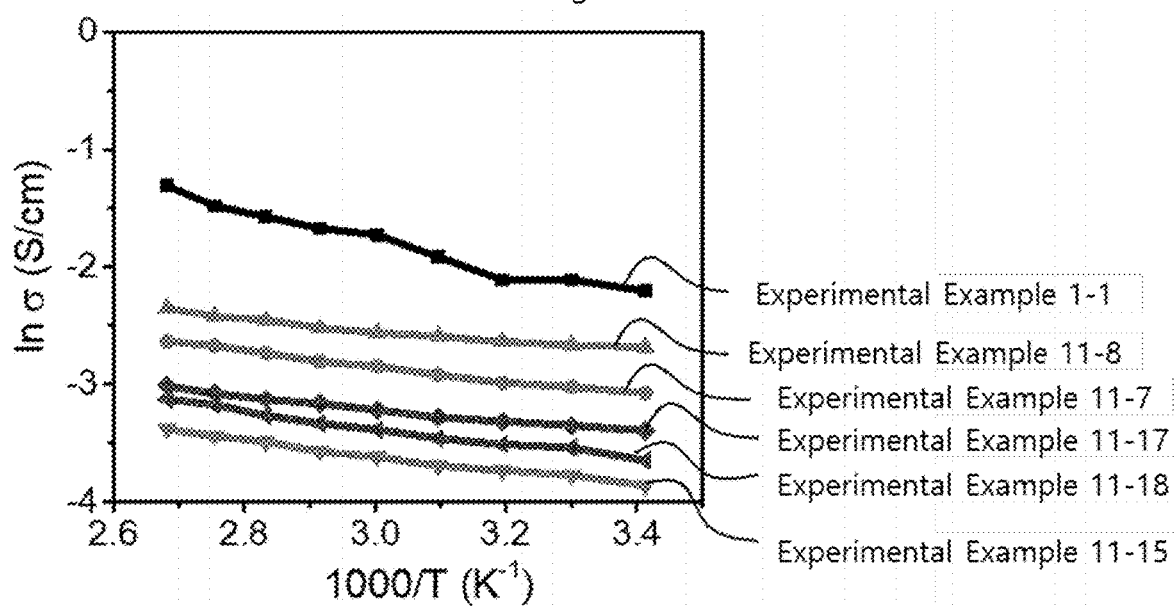

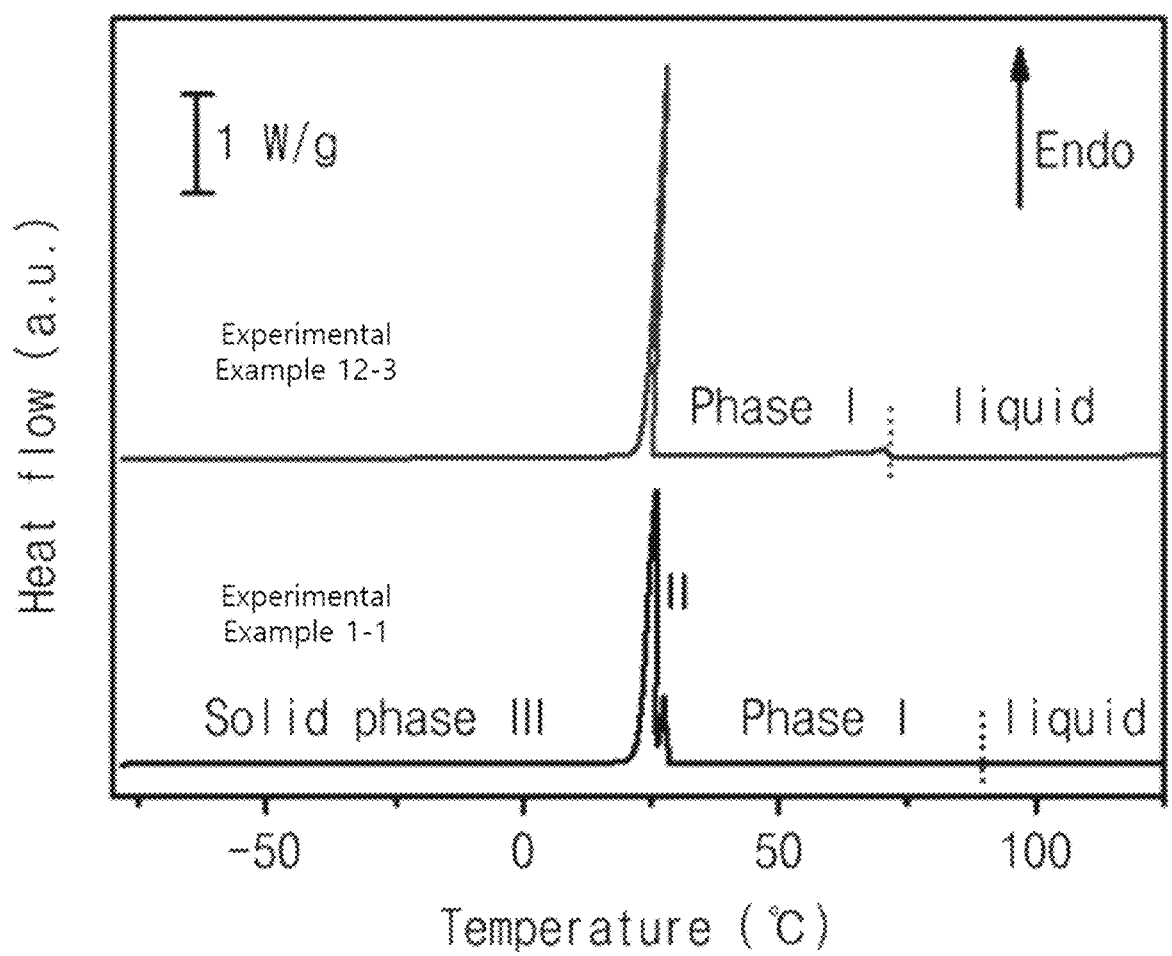

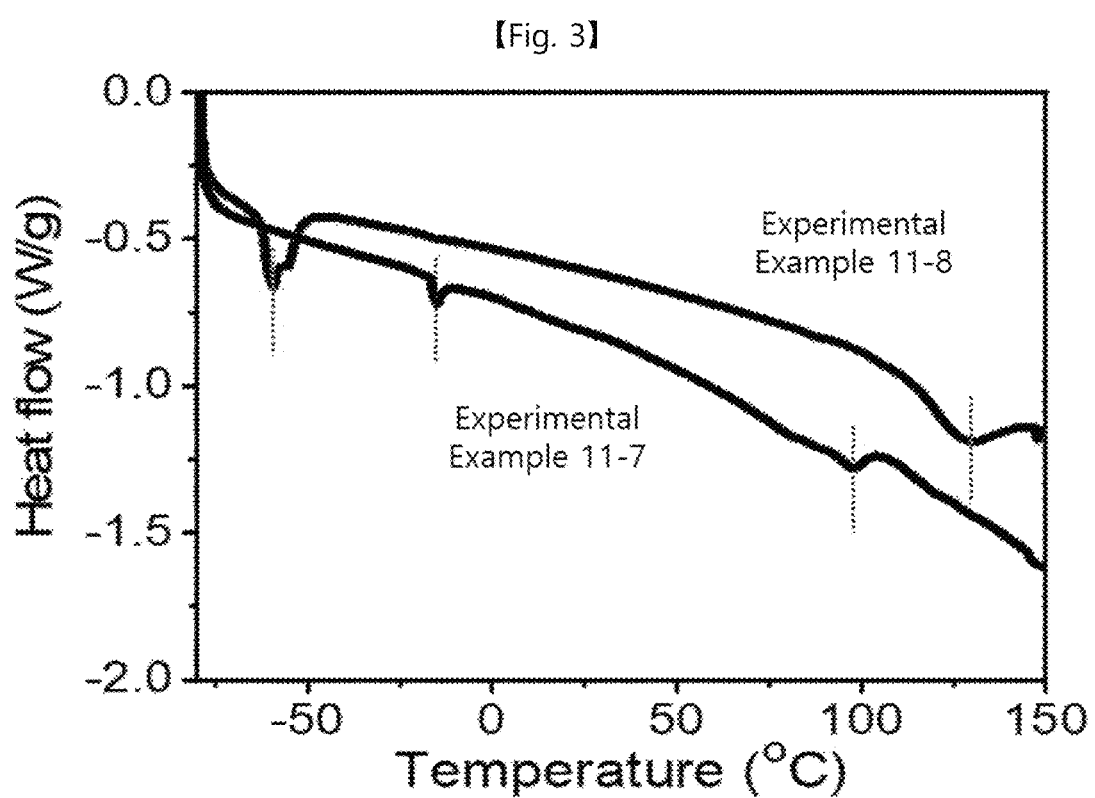

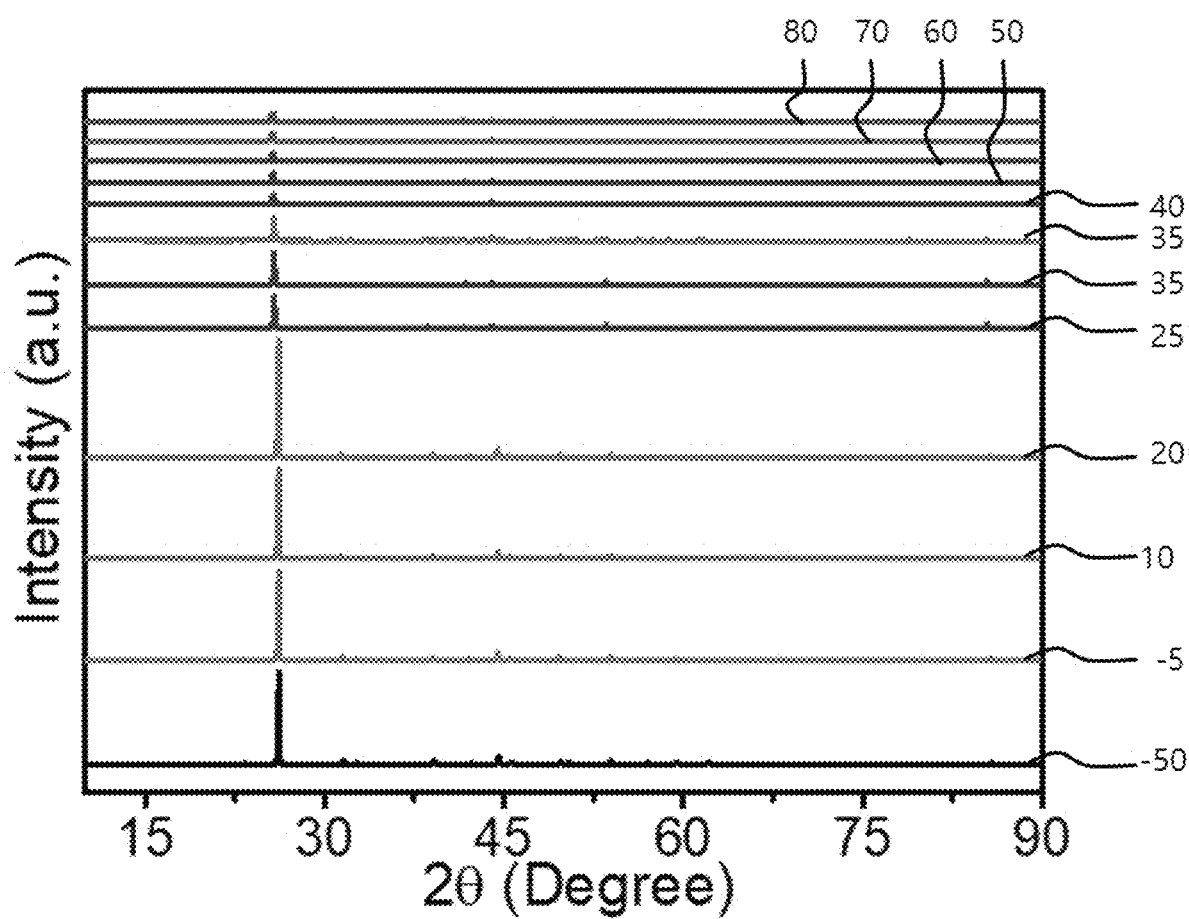

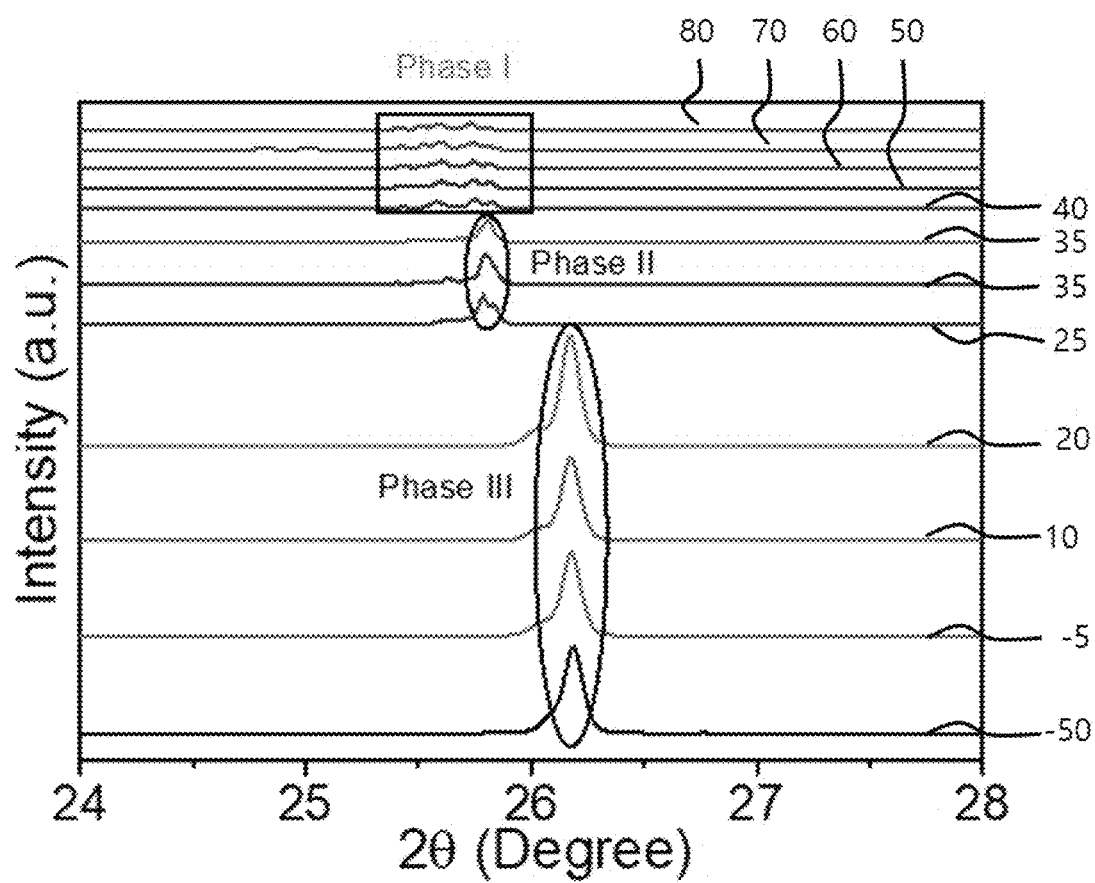

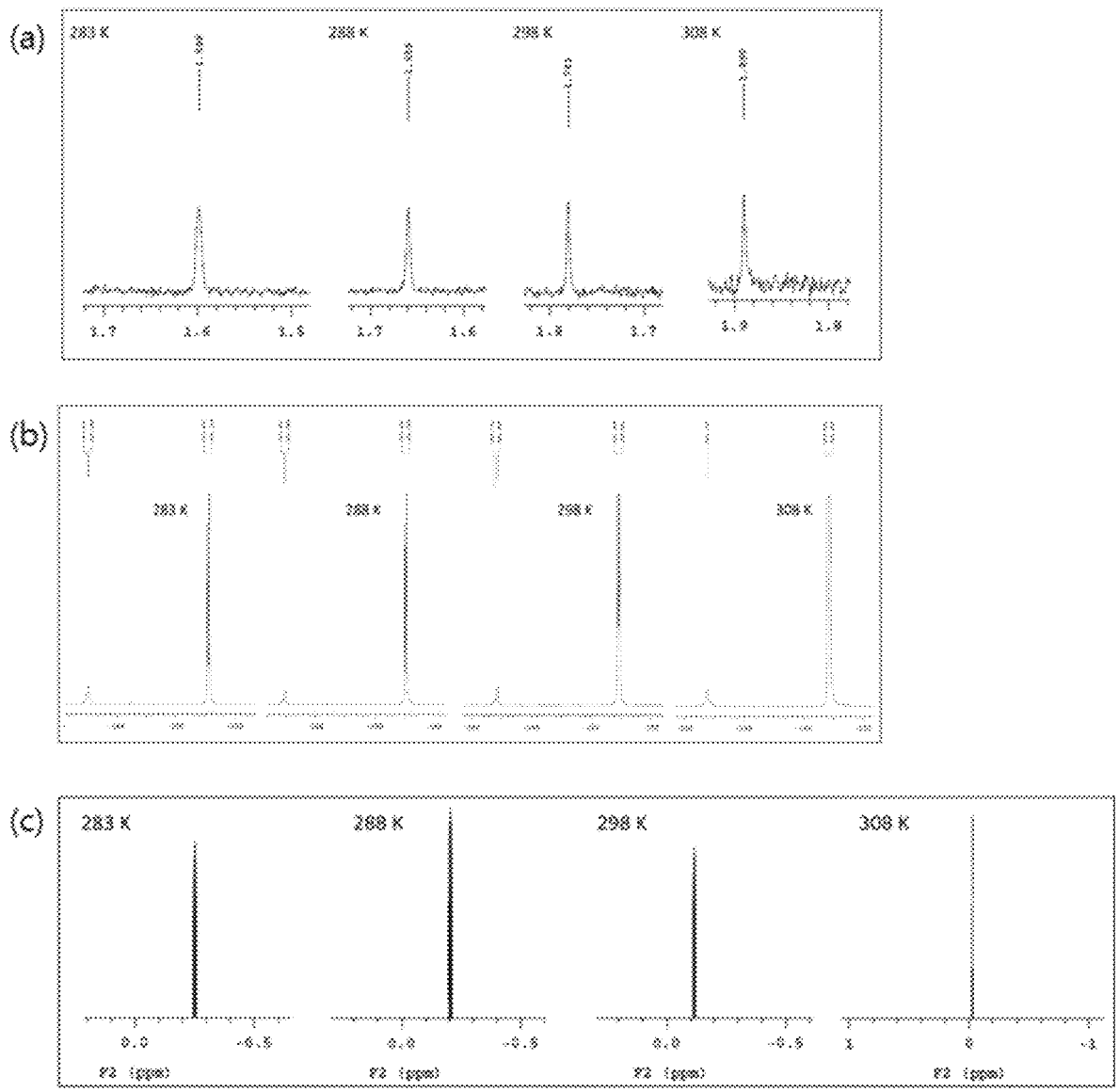
[Fig. 6]

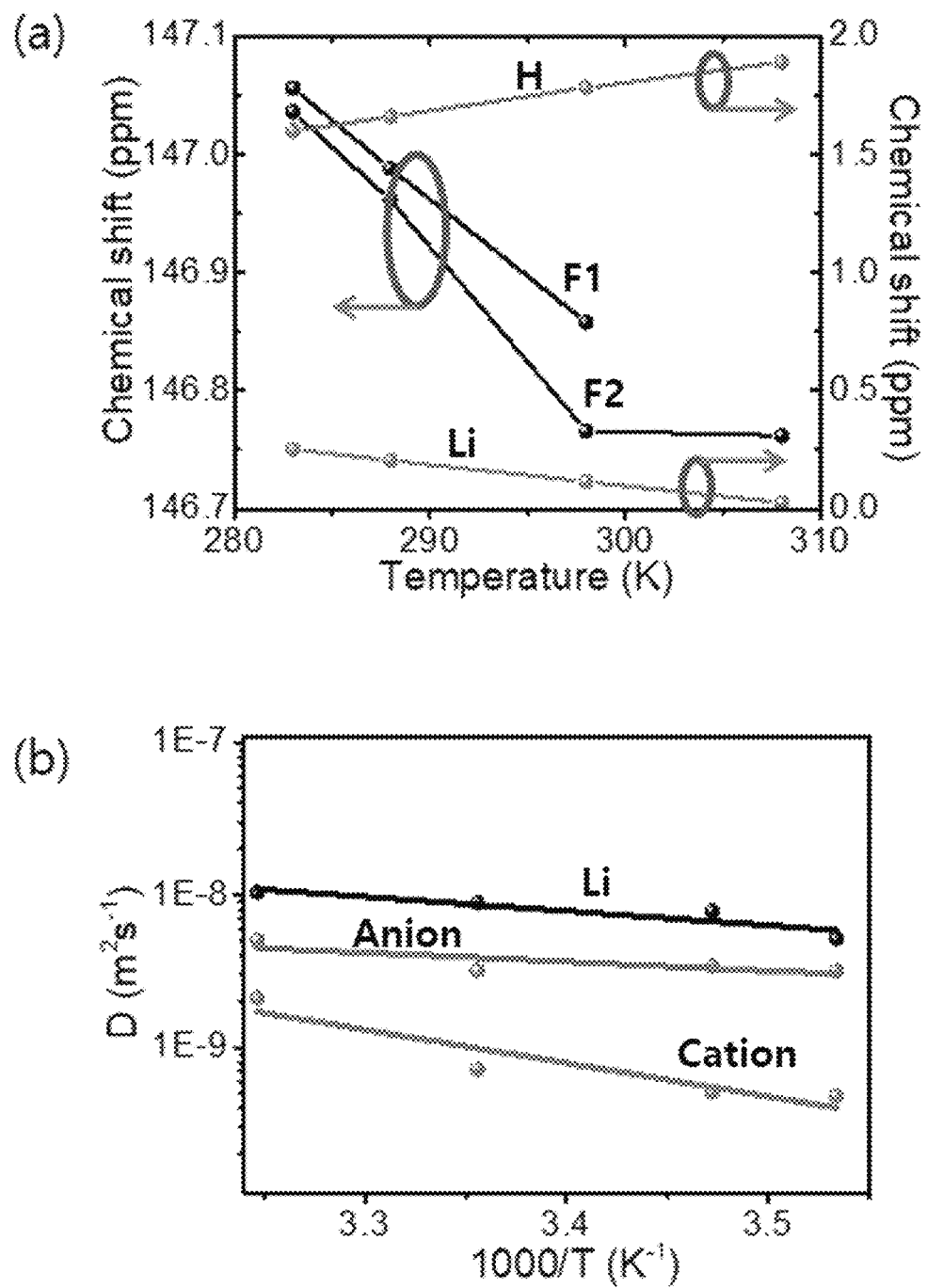
[Fig. 7]

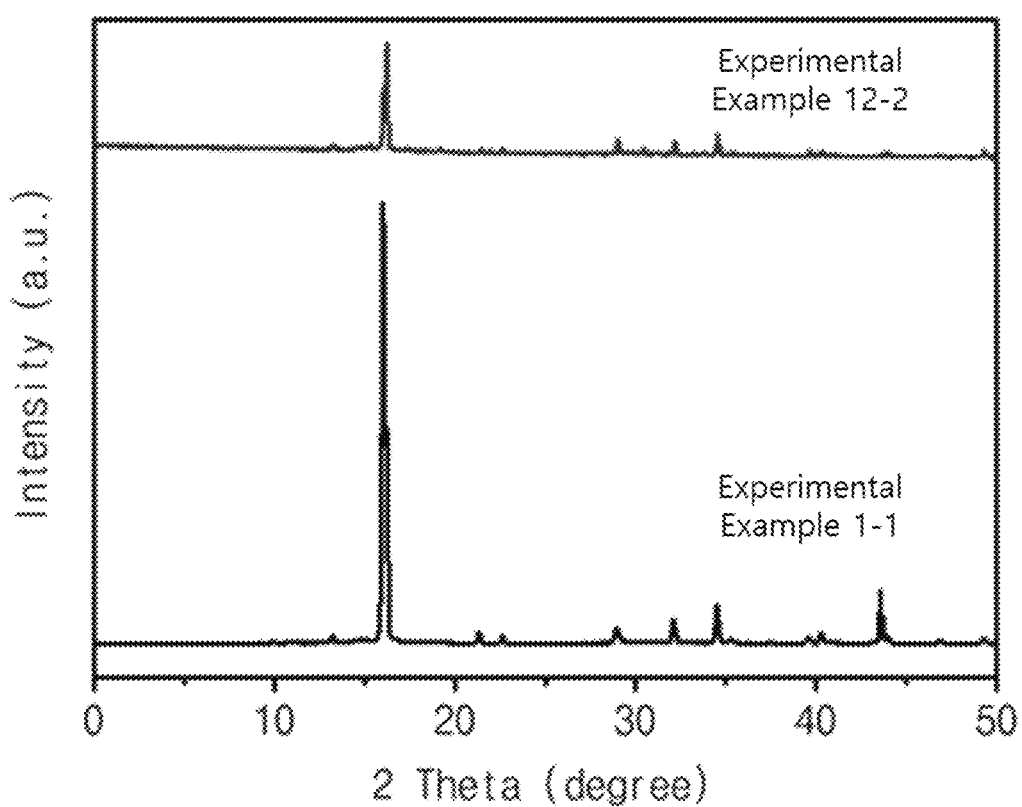
[Fig. 8]

[Fig. 9]
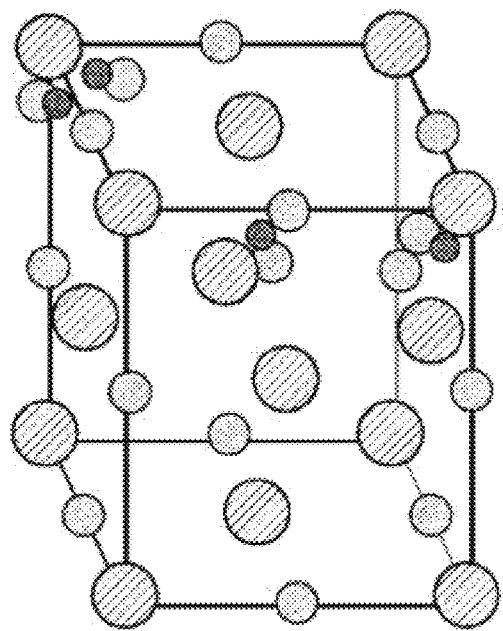
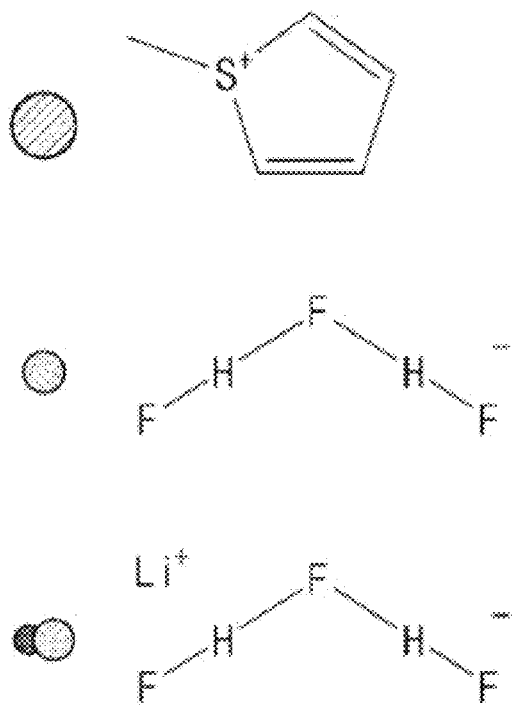

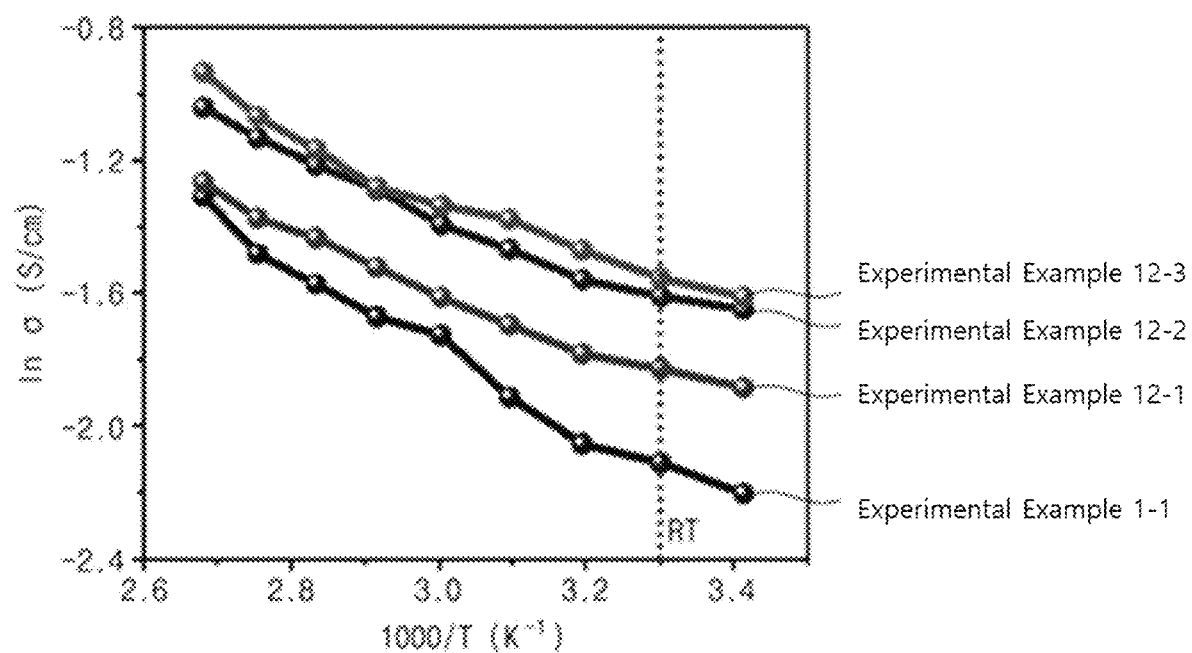

[Fig. 11]
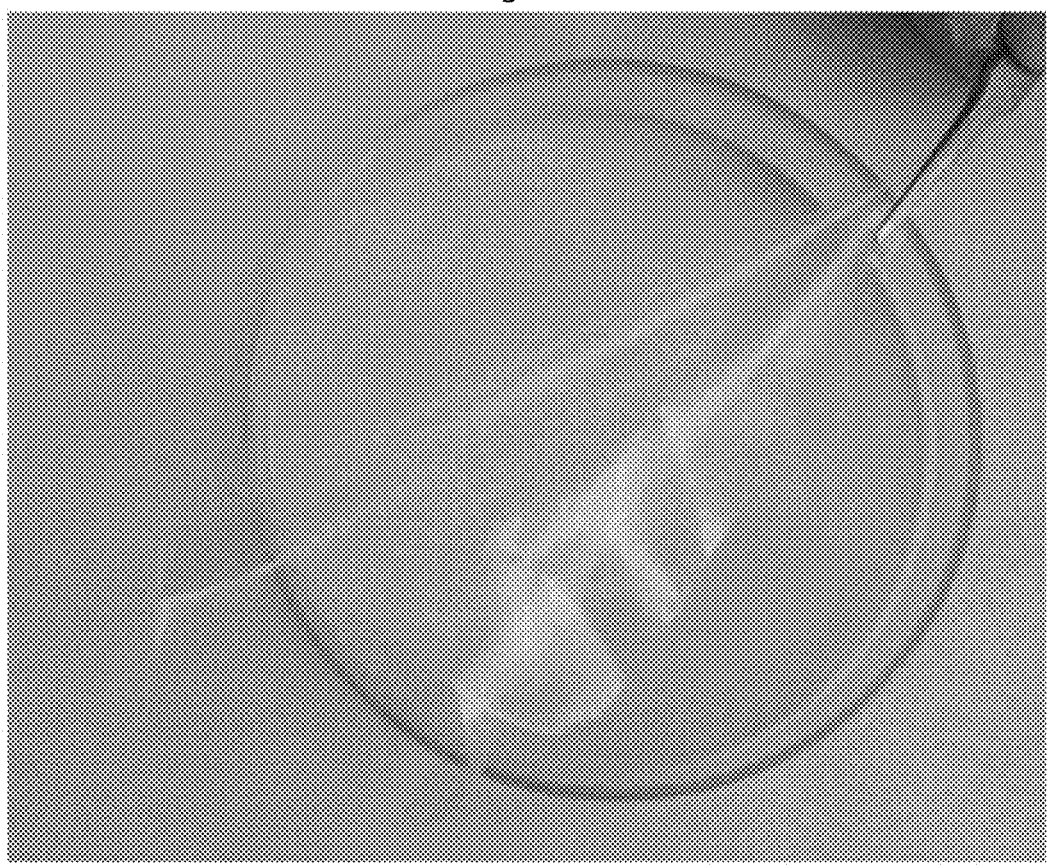

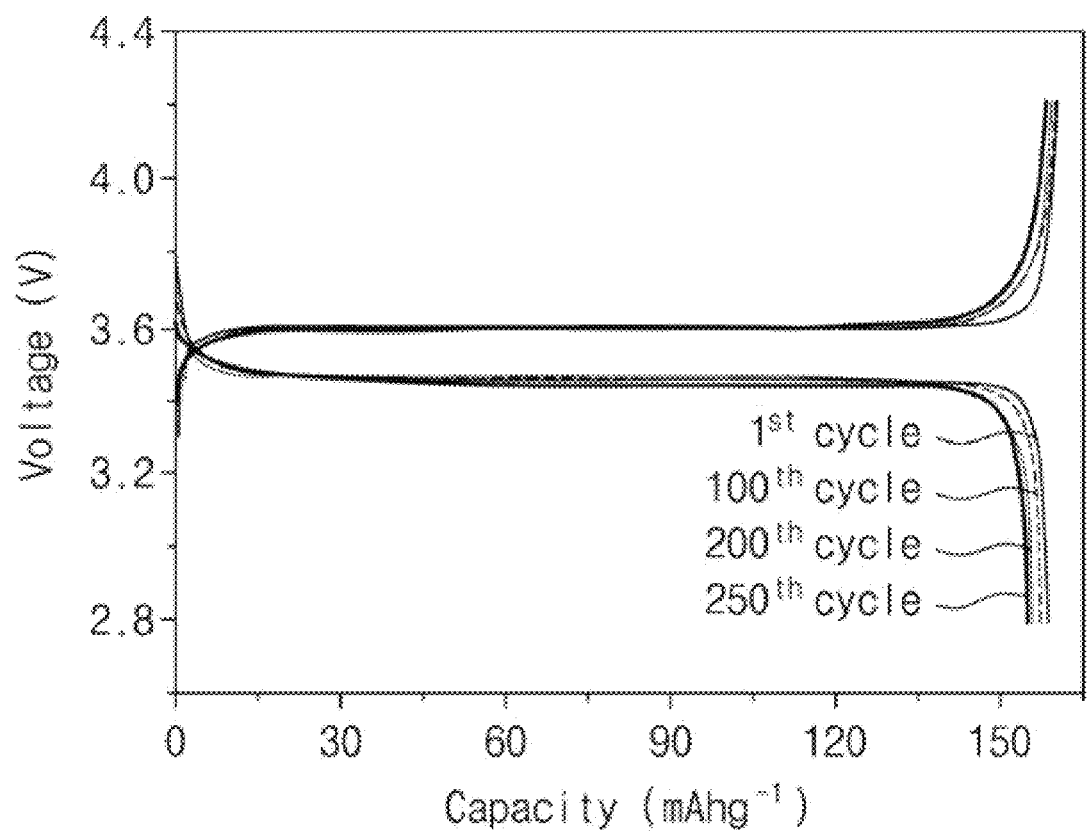
[Fig. 12]

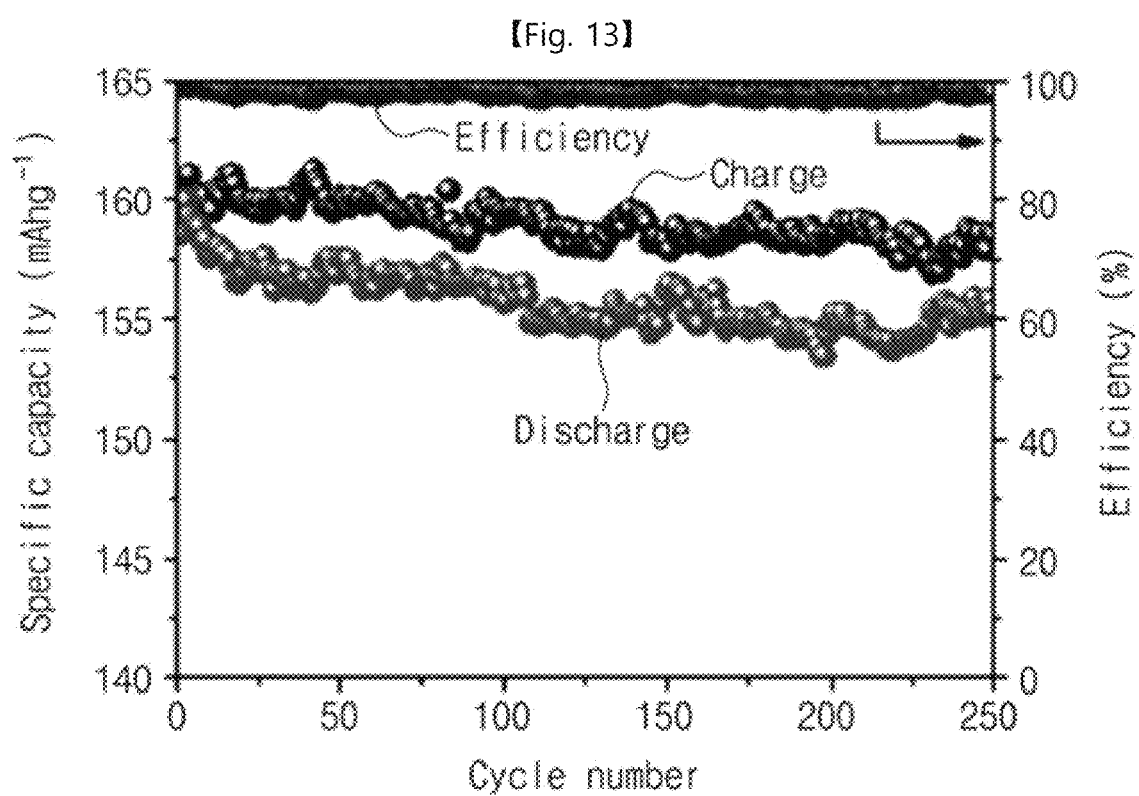
[Fig. 13]

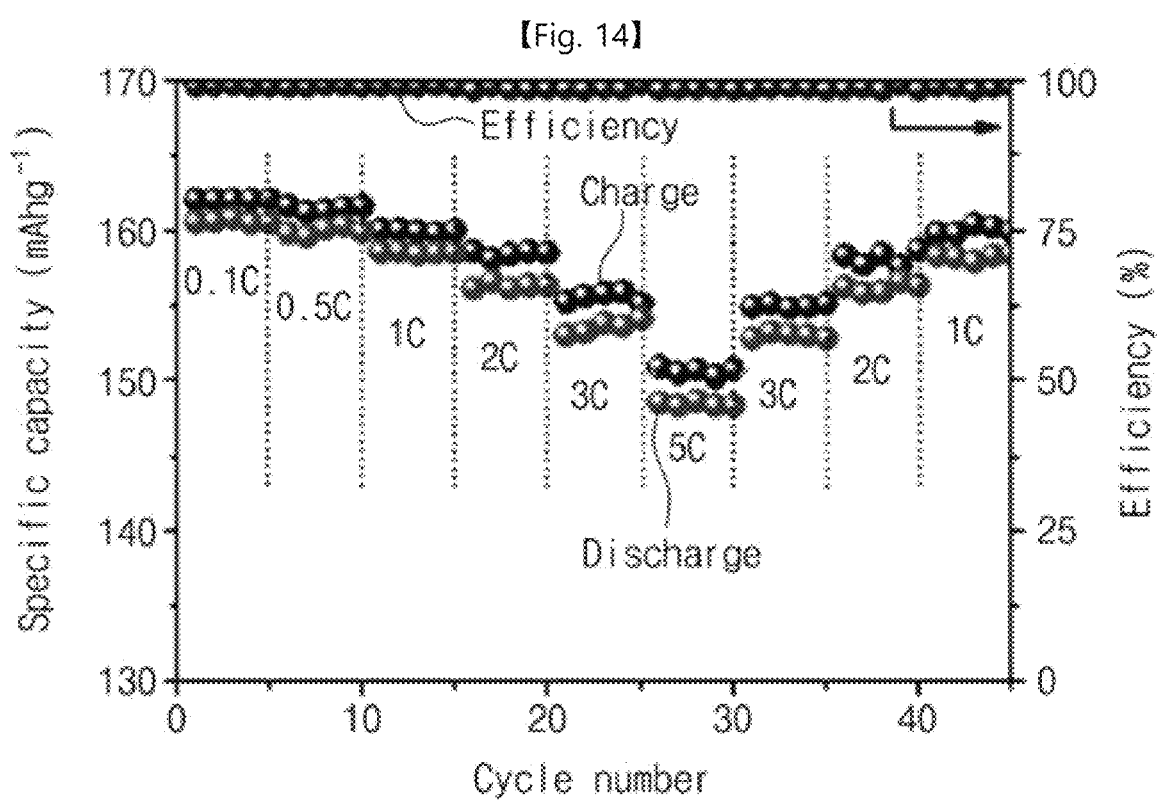
[Fig. 14]

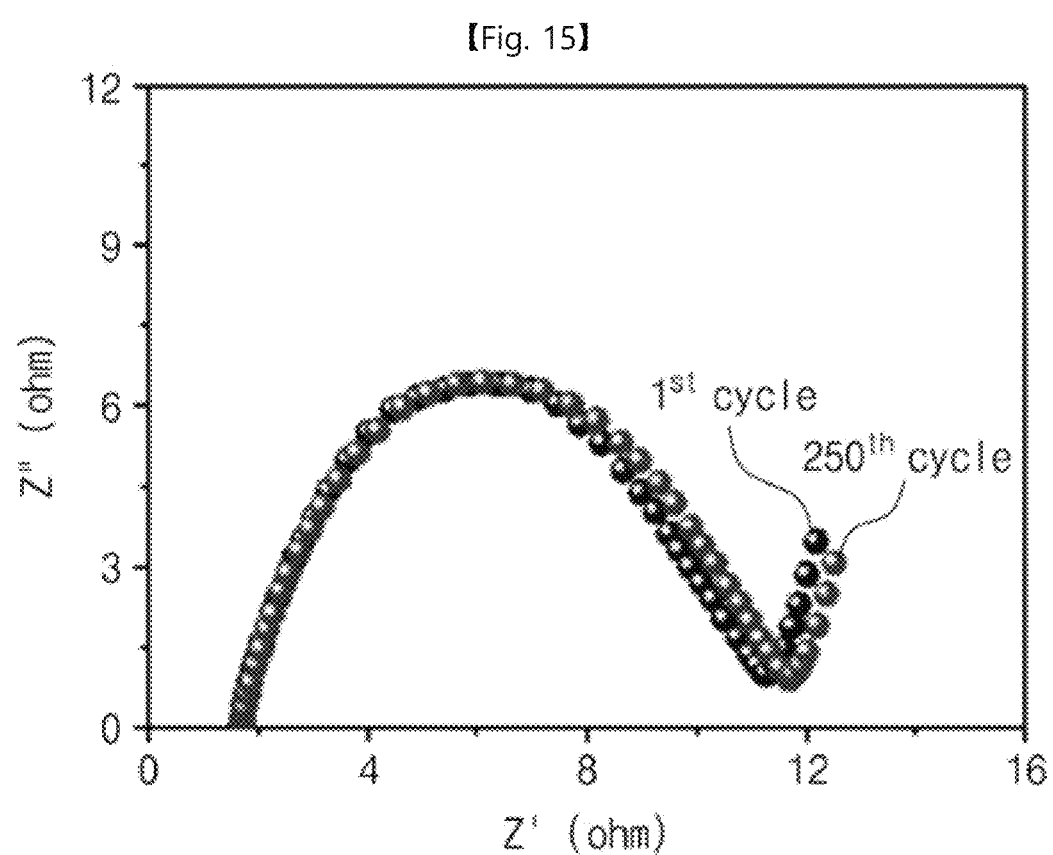
[Fig. 15]

INTERMEDIATE PRODUCT OF SOLID ELECTROLYTE, SOLID ELECTROLYTE USING SAME, SECONDARY BATTERY INCLUDING SAME, AND METHOD FOR MANUFACTURING SAME

TECHNICAL FIELD

The present application relates to an intermediate product of a solid electrolyte, a solid electrolyte using the same, a secondary battery including the same, and a method for preparing the same, and more particularly, to an intermediate product of a solid electrolyte including a compound in which a cation and an anion are bound, a solid electrolyte using the same, a secondary battery including the same, and a method for manufacturing the same.

BACKGROUND ART

In general, a secondary battery includes a positive electrode, a negative electrode, and an electrolyte provided between the positive electrode and the negative electrode. The secondary battery is used in portable electronic devices such as smart phones. In the market for portable electronic devices, the electronic devices are being manufactured to have thin and flexible properties. Accordingly, there is a demand for smaller and lighter secondary batteries. Now, however, a liquid-based material, in which salt including ions such as lithium, sodium or the like is mixed in an organic solvent, is mainly used as an electrolyte for the secondary battery. In this case, with the use of the secondary battery, there is a problem in that the organic solvent of the electrolyte is likely to volatilize or leak, and there is also a risk of explosion due to swelling as a temperature rises. Accordingly, there is a growing need for a solid electrolyte with enhanced stability compared to a liquid electrolyte. In this case, the general solid electrolyte has a lower ion conductivity compared to the liquid electrolyte. To compensate for this defect, there has been an ongoing study on the solid electrolyte containing an ionic material.

For example, Korean Unexamined Patent Publication No. 10-2014-0046611 (application no. 10-2012-0111557) provides a composition for an ionic liquid polymer electrolyte, which includes an ionic liquid monomer having a vinyl group and an ionic group, an organic electrolyte, and a cross-linking agent having at least two double bonds at a terminal, in which the ionic group includes a cation and an anion. Accordingly, disclosed is a method for preparing a composition for an ionic liquid polymer electrolyte capable of solving the problem of electrolyte leakage and providing a lithium secondary battery having excellent flame retardant properties.

DISCLOSURE

Technical Problem

One technical object of the present application is to provide an intermediate product of a solid electrolyte, a solid electrolyte using the same, a secondary battery including the same, and a method for manufacturing the same.

Another technical object of the present application is to provide an intermediate product of a solid electrolyte including a compound in which a cation and an anion are bound and which has a crystal phase, a solid electrolyte using the same, a secondary battery including the same, and a method for manufacturing the same.

Still another technical object of the present application is to provide an intermediate product of a solid electrolyte having a high ion conductivity, a solid electrolyte using the same, a secondary battery including the same, and a method for manufacturing the same.

Still another technical object of the present application is to provide a cation source and an anion source for preparing a solid electrolyte including a compound in which a cation and an anion are bound.

The technical objects of the present application are not limited to the above.

Technical Solution

To solve the above technical objects, the present application may provide an intermediate product of a solid electrolyte.

According to one embodiment, the intermediate product of the solid electrolyte may include a compound in which a cation including thiophenium or thiazolium and an anion including fluorohydrogenate are bound, and a solvent in which the compound is mixed.

According to one embodiment, the intermediate product of the solid electrolyte including the compound and the solvent may be in a liquid or gel state.

According to one embodiment, the solvent may include at least one of acetonitrile, tetrahydrofuran, DMSO, or DMF.

According to one embodiment, the cation may include the thiophenium and the compound may include a methyl group bonded with a sulfur element of the thiophenium.

According to one embodiment, the cation may include the thiazolium and the compound may include an ethyl group bonded with a nitrogen element of the thiazolium.

To solve the above technical objects, the present application may provide a method for preparing a solid electrolyte.

According to one embodiment, the method for preparing a solid electrolyte may include providing an intermediate product of a solid electrolyte according to the above-described embodiments, and removing and drying the solvent included in the intermediate product of the solid electrolyte to prepare a solid electrolyte.

To solve the above technical objects, the present application may provide a secondary battery.

According to one embodiment, the secondary battery may include a positive electrode, a solid electrolyte disposed on the positive electrode and prepared according to the above-described embodiment, and a negative electrode disposed on the solid electrolyte.

According to one embodiment, a positive electrode active material of the positive electrode may include lithium, phosphorus, and iron, and a negative electrode active material of the negative electrode may include lithium.

To solve the above technical objects, the present application may provide a cation source for preparing a solid electrolyte.

According to one embodiment, the cation source for preparing the solid electrolyte may be intended for preparing a solid electrolyte including a compound in which a cation and an anion are bound, and may include a solution containing an alkyl group, and thiophene or thiazoline mixed in the solution containing the alkyl group.

According to one embodiment, thiophene may be mixed in the solution containing the alkyl group, and the solution containing the alkyl group may include dichloromethane and acetonitrile.

According to one embodiment, thiazoline may be mixed in the solution containing the alkyl group, and the solution containing the alkyl group may include ethyl chloride and acetonitrile.

To solve the above technical objects, the present application may provide an anion source for preparing a solid electrolyte.

According to one embodiment, the anion source for preparing the solid electrolyte may be intended for preparing a solid electrolyte including a compound in which a cation and an anion are bound, and may include a solvent including water, and hydrofluoric acid mixed in the solvent.

According to one embodiment, the anion source may further include lithium salt in addition to the solvent and the hydrofluoric acid.

Advantageous Effects

According to an embodiment of the present application, there may be provided an intermediate product of a solid electrolyte including a compound in which a cation including thiophenium or thiazolium and an anion including fluorohydrogenate are bound, as well as a solvent in which the compound is mixed.

In addition, according to an embodiment of the present application, there may be provided a cation source for preparing a solid electrolyte including a solution containing an alkyl group, and thiophene or thiazoline mixed in the solution containing the alkyl group, and an anion source for preparing a solid electrolyte including a solvent including water, and hydrofluoric acid mixed in the solvent.

The intermediate product of the solid electrolyte may be provided in a liquid or gel state, and the cation source and the anion source for preparing the solid electrolyte may be provided in a liquid state. Thus, compared to those provided in a solid state, the intermediate product of the solid electrolyte, the cation source, and the anion source can be easily stored, distributed, and transported. Accordingly, the cost for preparing the solid electrolyte can be saved, and mass production of the solid electrolyte can be facilitated.

DESCRIPTION OF DRAWINGS

FIG. 1 is a graph showing an ion conductivity of compounds according to Experimental Examples 1-1, 11-7, 11-8, 11-15, 11-17 and 11-18 of the present application as measured depending on a temperature.

FIG. 2 is a differential scanning calorimetry (DSC) graph showing a compound according to Experimental Example 1-1 and a solid electrolyte according to Experimental Example 12-3 of the present application.

FIG. 3 is a DSC graph showing a compound according to Experimental Examples 11-7 and 11-8 of the present application.

FIGS. 4 and 5 are graphs showing an X-ray diffraction (XRD) pattern of a compound according to Experimental Example 1-1 of the present application depending on a temperature.

FIG. 6 is a graph showing an NMR analysis result of a solid electrolyte according to Experimental Example 12-1 of the present application.

FIG. 7 is a graph showing a chemical shift and a diffusion coefficient of a solid electrolyte according to Experimental Example 12-1 of the present application as measured depending on a temperature.

FIG. 8 is a graph showing an XRD pattern of a compound according to Experimental Example 1-1 and a solid electrolyte according to Experimental Example 12-2 of the present application.

FIG. 9 is a view for explaining a crystal structure of a solid electrolyte according to Experimental Examples 12-1 to 12-3 of the present application.

FIG. 10 is a graph showing an ion conductivity of a compound according to Experimental Example 1-1 and a solid electrolyte according to Experimental Examples 12-1 to 12-3 of the present application depending on a temperature.

FIG. 11 is a picture of a electrolyte membrane coated with a solid electrolyte according to Experimental Example 12-1 of the present application.

FIGS. 12 and 13 are graphs showing results of a cycle test of a secondary battery including a solid electrolyte according to Experimental Example 12-2 of the present application.

FIG. 14 is a graph showing a capacity retention rate depending on a charge/discharge rate of a secondary battery including a solid electrolyte according to Experimental Example 12-2 of the present application.

FIG. 15 is a graph showing an impedance depending on a cycle test of a secondary battery including a solid electrolyte according to Experimental Example 12-2 of the present application.

MODE FOR INVENTION

Hereinafter, preferred embodiments of the present application will be described in detail with reference to the accompanying drawings. However, the technical idea of the present application is not limited to the embodiments described herein and may be implemented in other forms. Rather, the embodiments introduced herein are provided to sufficiently deliver the spirit of the present application to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of the membrane and areas are exaggerated for efficient description of the technical contents.

Further, in the various embodiments of the present specification, the terms such as first, second, and third are used to describe various elements, but the elements are not limited to the terms. These terms are used only to distinguish one component from another component. Accordingly, an element mentioned as a first element in one embodiment may be mentioned as a second element in another embodiment. The embodiments described and illustrated herein also include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present application, a detailed description of known functions or configurations incorporated herein will be omitted when it may make the subject matter of the present invention unnecessarily unclear.

An intermediate product of a solid electrolyte according to an embodiment of the present application will be described.

According to an embodiment of the present application, the intermediate product of the solid electrolyte may include a compound in which a cation and an anion are bound, and a solvent in which the compound is mixed.

According to one embodiment, the cation may be thiophenium represented by <Formula 1> below. The compound may include an alkyl group (R1) bonded with a sulfur element of the thiophenium.

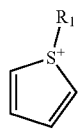

<Formula 1>

For example, the cation may have a methyl group represented by <Formula 2> below, an ethyl group represented by <Formula 3>, a propyl group represented by <Formula 4>, or a butyl group represented by <Formula 5>.

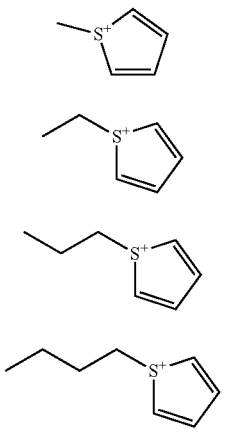

<Formula 2>

<Formula 3>

<Formula 4>

<Formula 5>

According to another embodiment, the cation may be thiazolium represented by <Formula 6> below. The compound may include an alkyl group (R1) bonded with a nitrogen element of the thiazolium.

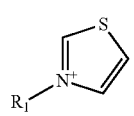

<Formula 6>

For example, the cation may have a methyl group represented by <Formula 7> below, an ethyl group represented by <Formula 8>, a propyl group represented by <Formula 9>, or a butyl group represented by <Formula 10>.

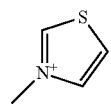

<Formula 7>

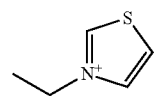

<Formula 8>

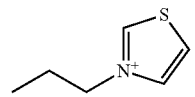

<Formula 9>

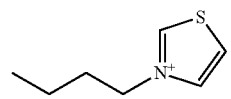

<Formula 10>

The anion may include fluorohydrogenate represented by <Formula 11>.

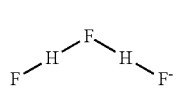

<Formula 11>

The compound may include a compound in which a cation including the thiophenium and an anion including the fluorohydrogenate are bound, or may include a compound in which a cation including the thiazolium and an anion including the fluorohydrogenate are bound.

The compound may be provided in a state in which the compound is dispersed or dissolved in the solvent. The solvent may include at least any one of acetonitrile, tetrahydrofuran, DMSO, or DMF.

The intermediate product of the solid electrolyte including the compound and the solvent may be in a liquid or gel state. The intermediate product of the solid electrolyte in a liquid or gel state may be stored, transported and distributed.

The solid electrolyte may be prepared by removing and drying the solvent included in the intermediate product of the solid electrolyte. The solid electrolyte may include a compound in which the cation including the thiophenium or the thiazolium and the anion including the fluorohydrogenate are bound, may be in a flexible solid state, and may have crystallinity. In other words, the solid electrolyte may be in a flexible and crystalline solid state having a high ion conductivity, in which the cation and the anion are bound.

The solid electrolyte may be provided between a positive electrode and a negative electrode to configure a secondary battery. In this case, according to one embodiment, a positive electrode active material included in the positive electrode may include lithium, phosphorus, and iron, and a negative electrode active material included in the negative electrode may include lithium.

A method for preparing an intermediate product of the solid electrolyte, a cation source for preparing the solid electrolyte, and an anion source for preparing the solid electrolyte may be described.

A cation source and an anion source for preparing the solid electrolyte including the compound in which the cation and the anion are bound may be provided.

If the cation is thiophenium, the cation source may include a solution containing an alkyl group, and thiophene.

In this case, the cation source may include thiophenium salt. Alternatively, if the cation is thiazolium, the cation source may include a solution containing an alkyl group, and thiazoline. In this case, the cation source may include thiazolium salt.

According to one embodiment, the solution containing the alkyl group may be prepared by adding an alkyl group precursor into a solvent and stirring at room temperature. For example, the solvent may be acetonitrile. Specifically, for example, the alkyl group precursor may include any one of dichloromethane represented by <Formula 12> below, ethyl chloride represented by <Formula 13> below, propyl chloride represented by <Formula 14> below, or butyl chloride represented by <Formula 15> below.

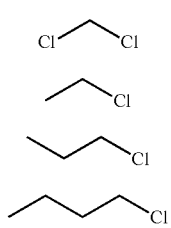

<Formula 12>
<Formula 13>
<Formula 14>
<Formula 15>

The cation source may be prepared by dripping and reacting the thiophene or the thiazoline into the solution containing the alkyl group. Unlike the above, if a large amount of the thiophene or the thiazoline is added into the solution containing the alkyl group at one time, the reactivity between the thiophene or the thiazoline and the solution containing the alkyl group may decrease, and thus it may not be easy to prepare the cation source.

Accordingly, as described above, the thiophene or the thiazoline may be dripped into the solution containing the alkyl group, and thus the reactivity between the solution containing the thiophene or the thiazoline and the alkyl group may increase to enhance an yield of the thiophenium salt or the thiazoline salt.

According to one embodiment, as a length of a chain of the alkyl group in the solution containing the alkyl group increases, a reaction time may increase. Thus, as the length of the chain of the alkyl group increases, a temperature of the reaction may increase. Accordingly, a manufacturing process time for the cation source may be shortened and a manufacturing cost may be reduced, and thus mass production may be facilitated.

As described above, the thiophenium salt may include an alkyl group bonded with a sulfur atom of the thiophenium as represented by <Formula 1> to <Formula 5>. For example, the thiophenium salt may include thiophenium chloride containing any one of a methyl group, an ethyl group, a propyl group or a butyl group.

Specifically, for example, if the solution containing the alkyl group includes dichloromethane represented by <Formula 12>, the thiophene may be dripped into the solution containing the dichloromethane, and reacted at room temperature, and the thiophenium salt may include one in which a carbon element of the dichloromethane is bonded with a sulfur element of the thiophene as represented by <Formula 16>.

<Formula 16>

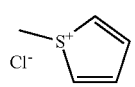

As another example, if the solution containing the alkyl group includes ethyl chloride represented by <Formula 13>, the thiophene may be dripped into the solution containing the ethyl chloride, and reacted at a temperature higher than room temperature and the thiophenium salt may include one in which a carbon element of the ethyl chloride is bonded with a sulfur element of the thiophene as represented by <Formula 17>.

<Formula 17>

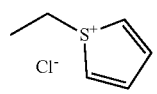

As still another example, if the solution containing the alkyl group includes propyl chloride represented by above <Formula 14>, the thiophene may be dripped into the solution containing the propyl chloride, and reacted at a temperature higher than room temperature and the thiophenium salt may include one in which a carbon element of the propyl chloride is bonded with a sulfur element of the thiophene as represented by <Formula 18>.

<Formula 18>

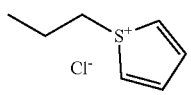

As still another example, if the solution containing the alkyl group includes butyl chloride represented by above <Formula 15>, the thiophene may be dripped into the solution containing the butyl chloride, and reacted at a temperature higher than room temperature and the thiophenium salt may include one in which a carbon element of the butyl chloride is bonded with a sulfur element of the thiophene as represented by <Formula 19>.

<Formula 19>

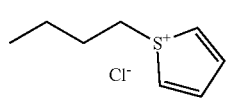

The thiazolium salt may include an alkyl group bonded with a nitrogen atom of the thiazolium as represented by <Formula 6> to <Formula 10>. For example, the thiazolium salt may include thiazolium chloride containing any one of a methyl group, an ethyl group, a propyl group or a butyl group.

Specifically, for example, if the solution containing the alkyl group includes dichloromethane represented by above <Formula 12>, the thiazoline may be dripped into the solution containing the dichloromethane, and reacted at room temperature, and the thiazolium salt may include one in which a carbon element of the dichloromethane is bonded with a nitrogen element of the thiazoline as represented by <Formula 20>.

<Formula 20>

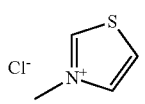

As another example, if the solution containing the alkyl group includes ethyl chloride represented by above <Formula 13>, the thiazoline may be dripped into the solution containing the ethyl chloride, and reacted at a temperature higher than room temperature and the thiazolium salt may include one in which a carbon element of the ethyl chloride is bonded with a nitrogen element of the thiazoline as represented by <Formula 21>.

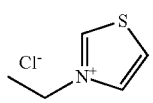

<Formula 21>

As still another example, if the solution containing the alkyl group includes propyl chloride represented by above <Formula 14>, the thiazoline may be dripped into the solution containing the propyl chloride, and reacted at a temperature higher than room temperature and the thiazolium salt may include one in which a carbon element of the propyl chloride is bonded with a nitrogen element of the thiazoline as represented by <Formula 22>.

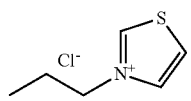

<Formula 22>

As still another example, if the solution containing the alkyl group includes butyl chloride represented by above <Formula 15>, the thiazoline may be dripped into the solution containing the butyl chloride, and reacted at a temperature higher than room temperature and the thiazolium salt may include one in which a carbon element of the butyl chloride is bonded with a nitrogen element of the thiazoline as represented by <Formula 23>.

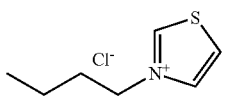

<Formula 23>

The anion source may include a solvent including water and hydrofluoric acid mixed in the solvent. Specifically, the anion source prepared by stirring hydrofluoric acid and water may be a fluorohydrogenate precursor.

According to one embodiment, the anion source may further include lithium salt in addition to the solvent and the hydrofluoric acid. For example, the lithium salt may include lithium chloride. In this case, the anion source may be a lithium fluorohydrogenate precursor.

The cation source and the anion source may be stored, transported, and distributed in a liquid state while being provided in a container. The container may include an air conditioner which creates an environment suitable for storing the cation source and the anion source, and thus a temperature, humidity, and pressure inside the container may be adjusted.

An intermediate product of the solid electrolyte may be prepared by mixing the cation source and the anion source.

Specifically, the intermediate product of the solid electrolyte may be prepared by preparing a mixed solution in which the cation source and the anion source are mixed, and reacting the mixed solution. The mixed solution may be reacted at a temperature lower than room temperature (e.g., −70° C.).

Unlike the above, if the mixed solution is reacted at room temperature, the fluorohydrogenate precursor may be evaporated. Specifically, the fluorohydrogenate precursor may have a boiling point at a temperature equal to or lower than room temperature, and thus may be volatilized at room temperature.

Thus, as described above, if the mixed solution is reacted at a temperature lower than room temperature, the intermediate product of the solid electrolyte may be easily prepared. In addition, as a temperature of the reaction decreases, a loss of the fluorohydrogenate precursor may decrease, and thus a reaction time may decrease.

According to an embodiment of the present application, the intermediate product of the solid electrolyte may be provided in a liquid or gel state, and the cation source and the anion source for preparing the solid electrolyte may be provided in a liquid state. Thus, compared to those provided in a solid state, the intermediate product of the solid electrolyte, the cation source, and the anion source may be easily stored, distributed, and transported. Accordingly, the cost for preparing the solid electrolyte may be saved, and mass production of the solid electrolyte may be facilitated.

Hereinafter, according to specific experimental examples of the present application, a solid electrolyte including a compound in which various cations and anions are bound, and results of evaluating their properties will be described.

Preparing of Compound According to Experimental Example 1-1

Acetonitrile was provided into a conical flask, after which dichloromethane was added and stirred at room temperature for 10 minutes to prepare a solution containing an alkyl group. In this case, the preparation of the solution containing the alkyl group was performed in a glove box without moisture.

Thiophene was dripped into the solution containing the alkyl group while being stirred, after which a uniformly mixed solution was slowly stirred at room temperature for four days so as to prepare thiophenium salt having a methyl group which is a cation source.

A washing process was performed by providing the thiophenium salt and a solvent of ethyl acetate and diethyl ether into a rotary concentrator.

1M hydrofluoric acid and extra water were added into a conical flask and stirred for 10 minutes to prepare a fluorohydrogenate precursor which is an anion source.

Thiophenium salt was added into the fluorohydrogenate precursor to prepare a mixed solution. The mixed solution was left alone at a temperature of −70° C. for 24 hours, so as to prepare a compound in which thiazolium salt and the fluorohydrogenate were bound as an intermediate product of the solid electrolyte.

The compound was provided into a glove box under a nitrogen atmosphere and left alone at room temperature for two to three hours, so that volatile gas was removed. After that, a drying process was performed by providing the compound into the rotary concentrator, so as to prepare a compound according to Experimental Example 1-1, in which a thiophenium cation having a methyl group (R1) and a fluorohydrogenate anion are bound.

Preparing of Compound According to Experimental Example 1-2

A compound was prepared by the same method as described above in Experimental Example 1-1. However, ethyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 1-2, in which a thiophenium cation having an ethyl group (R1) and a fluorohydrogenate anion are bound.

Preparing of Compound According to Experimental Example 1-3

A compound was prepared by the same method as described above in Experimental Example 1-1. However, propyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 1-3, in which a thiophenium cation having a propyl group (R1) and a fluorohydrogenate anion are bound.

Preparing of Compound According to Experimental Example 1-4

A compound was prepared by the same method as described above in Experimental Example 1-1. However, butyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 1-4, in which a thiophenium cation having a butyl group (R1) and a fluorohydrogenate anion are bound.

Preparing of Compound According to Experimental Example 2-1

A compound was prepared by the same method as described above in Experimental Example 1-1, but thiazoline was added into a solution containing an alkyl group so as to prepare thiazolium salt as a cation source.

After that, thiazolium salt and a fluorohydrogenate precursor were reacted by the same method as described above in Experimental Example 1-1, so as to prepare the compound according to Experimental Example 2-1, in which a thiazolium cation having a methyl group (R1) and a fluorohydrogenate anion are bound.

Preparing of Compound According to Experimental Example 2-2

A compound was prepared by the same method as described above in Experimental Example 1-2, but thiazoline was added into a solution containing an alkyl group so as to prepare thiazolium salt as a cation source.

After that, thiazolium salt and a fluorohydrogenate precursor were reacted by the same method as described above in Experimental Example 1-2, so as to prepare the compound according to Experimental Example 2-2, in which a thiazolium cation having an ethyl group (R1) and a fluorohydrogenate anion are bound.

Preparing of compound according to Experimental Example 2-3

A compound was prepared by the same method as described above in Experimental Example 1-3, but thiazoline was added into a solution containing an alkyl group so as to prepare thiazolium salt as a cation source.

After that, thiazolium salt and a fluorohydrogenate precursor were reacted by the same method as described above in Experimental Example 1-3, so as to prepare the compound according to Experimental Example 2-3, in which a thiazolium cation having a propyl group (R1) and a fluorohydrogenate anion are bound.

Preparing of Compound According to Experimental Example 2-4

A compound was prepared by the same method as described above in Experimental Example 1-4, but thiazoline was added into a solution containing an alkyl group so as to prepare thiazolium salt as a cation source.

After that, thiazolium salt and a fluorohydrogenate precursor were reacted by the same method as described above in Experimental Example 1-4, so as to prepare the compound according to Experimental Example 2-4, in which a thiazolium cation having a butyl group (R1) and a fluorohydrogenate anion are bound.

Preparing of Compound According to Experimental Example 3-1

Phospholanium represented by <Formula 24> below was provided as a cation, and fluorohydrogenate prepared according to Experimental Example 1-1 as described above was used as an anion, so as to prepare the compound according to Experimental Example 3-1, in which a phospholanium cation having a methyl group (R1) and an ethyl group (R2) and a fluorohydrogenate anion are bound.

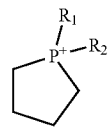

<Formula 24>

Preparing of Compound According to Experimental Example 3-2

A compound was prepared by the same method as described above in Experimental Example 3-1, so as to prepare the compound according to Experimental Example 3-2, in which a phospholanium cation having a methyl group (R1) and a propyl group (R2) and a fluorohydrogenate anion are bound.

Preparing of Compound According to Experimental Example 3-3

A compound was prepared by the same method as described above in Experimental Example 3-1, so as to prepare the compound according to Experimental Example 3-3, in which a phospholanium cation having a methyl group (R1) and a butyl group (R2) and a fluorohydrogenate anion are bound.

Preparing of Compound According to Experimental Example 3-4

A compound was prepared by the same method as described above in Experimental Example 3-1, so as to prepare the compound according to Experimental Example 3-4, in which a phospholanium cation having an ethyl group (R1) and a butyl group (R2) and a fluorohydrogenate anion are bound.

Preparing of Compound According to Experimental Example 3-5

A compound was prepared by the same method as described above in Experimental Example 3-1, so as to prepare the compound according to Experimental Example 3-5, in which a phospholanium cation having a methyl group (R1) and a methyl group (R2) and a fluorohydrogenate anion are bound.

Preparing of Compound According to Experimental Example 4-1

Oxathiolanium represented by <Formula 25> below was provided as a cation, and fluorohydrogenate prepared according to Experimental Example 1-1 as described above was used as an anion, so as to prepare the compound according to Experimental Example 4-1, in which an oxathiolanium cation having a methyl group (R1) and a fluorohydrogenate anion are bound.

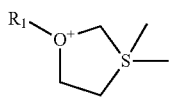

<Formula 25>

Preparing of Compound According to Experimental Example 4-2

A compound was prepared by the same method as described above in Experimental Example 4-1, so as to prepare the compound according to Experimental Example 4-2, in which an oxathiolanium cation having an ethyl group (R1) and a fluorohydrogenate anion are bound.

Preparing of Compound According to Experimental Example 4-3

A compound was prepared by the same method as described above in Experimental Example 4-1, so as to prepare the compound according to Experimental Example 4-3, in which an oxathiolanium cation having a propyl group (R1) and a fluorohydrogenate anion are bound.

Preparing of Compound According to Experimental Example 4-4

A compound was prepared by the same method as described above in Experimental Example 4-1, so as to prepare the compound according to Experimental Example 4-4, in which an oxathiolanium cation having a butyl group (R1) and a fluorohydrogenate anion are bound.

Preparing of Compound According to Experimental Example 5-1

Ammonium was provided as a cation, and fluorohydrogenate prepared according to Experimental Example 1-1 as described above was used as an anion, so as to prepare the compound according to Experimental Example 5-1, in which an ammonium cation having a tetraethyl group and a fluorohydrogenate anion are bound.

Preparing of Compound According to Experimental Example 5-2

A compound was prepared by the same method as described above in Experimental Example 5-1, so as to prepare the compound according to Experimental Example 5-2, in which an ammonium cation having a tetrabutyl group and a fluorohydrogenate anion are bound.

Preparing of Compound According to Experimental Example 5-3

A compound was prepared by the same method as described above in Experimental Example 5-1, so as to prepare the compound according to Experimental Example 5-3, in which an ammonium cation having a trimethyl group and a fluorohydrogenate anion are bound.

Preparing of Compound According to Experimental Example 5-4

A compound was prepared by the same method as described above in Experimental Example 5-1, so as to prepare the compound according to Experimental Example 5-4, in which an ammonium cation having a diethylmethyl group and a fluorohydrogenate anion are bound.

Preparing of Compound According to Experimental Example 6-1

Sulphonium was provided as a cation, and fluorohydrogenate prepared according to Experimental Example 1-1 as described above was used as an anion, so as to prepare the compound according to Experimental Example 6-1, in which a sulphonium cation having a trimethyl group and a fluorohydrogenate anion are bound.

Preparing of Compound According to Experimental Example 6-2

A compound was prepared by the same method as described above in Experimental Example 6-1, so as to prepare the compound according to Experimental Example 6-2, in which a sulphonium cation having a trimethyl group and a fluorohydrogenate anion are bound.

Preparing of Compound According to Experimental Example 7-1

Phosphonium was provided as a cation, and fluorohydrogenate prepared according to Experimental Example 1-1 as described above was used as an anion, so as to prepare the compound according to Experimental Example 7-1, in which a phosphonium cation having a trimethyl group and a fluorohydrogenate anion are bound.

Preparing of Compound According to Experimental Example 7-2

A compound was prepared by the same method as described above in Experimental Example 7-1, so as to prepare the compound according to Experimental Example 7-2, in which a phosphonium cation having a triethyl group and a fluorohydrogenate anion are bound.

Preparing of Compound According to Experimental Example 7-3

A compound was prepared by the same method as described above in Experimental Example 7-1, so as to prepare the compound according to Experimental Example 7-3, in which a phosphonium cation having a tributyldecyl group and a fluorohydrogenate anion are bound.

Preparing of Compound According to Experimental Example 8-1

Thiazolidinium represented by <Formula 26> below was provided as a cation, and fluorohydrogenate prepared according to Experimental Example 1-1 as described above was used as an anion, so as to prepare the compound according to Experimental Example 8-1, in which a thiazolidinium cation having a methyl group (R1) and an ethyl group (R2) bound to a nitrogen element, and two methyl groups bound to a sulfur element, and a fluorohydrogenate anion are bound.

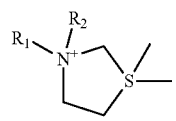

<Formula 26>

Preparing of Compound According to Experimental Example 8-2

A compound was prepared by the same method as described above in Experimental Example 8-1, so as to prepare the compound according to Experimental Example 8-2, in which a thiazolidinium cation having a methyl group (R1) and a propyl group (R2) bound to a nitrogen element, and two methyl groups bound to a sulfur element, and a fluorohydrogenate anion are bound.

Preparing of Compound According to Experimental Example 8-3

A compound was prepared by the same method as described above in Experimental Example 8-1, so as to prepare the compound according to Experimental Example 8-3, in which a thiazolidinium cation having a methyl group (R1) and a butyl group (R2) bound to a nitrogen element, and two methyl groups bound to a sulfur element, and a fluorohydrogenate anion are bound.

Preparing of Compound According to Experimental Example 8-4

A compound was prepared by the same method as described above in Experimental Example 8-1, so as to prepare the compound according to Experimental Example 8-4, in which a thiazolidinium cation having an ethyl group (R1) and a butyl group (R2) bound to a nitrogen element, and two methyl groups bound to a sulfur element, and a fluorohydrogenate anion are bound.

Preparing of Compound According to Experimental Example 9-1

Imidazolium represented by <Formula 27> below was provided as a cation, and fluorohydrogenate prepared according to Experimental Example 1-1 as described above was used as an anion, so as to prepare the compound according to Experimental Example 9-1, in which an imidazolium cation having a methyl group (R1) and an ethyl group (R2) and a fluorohydrogenate anion are bound.

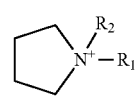

<Formula 27>

Preparing of Compound According to Experimental Example 9-2

A compound was prepared by the same method as described above in Experimental Example 9-1, so as to prepare the compound according to Experimental Example 9-2, in which an imidazolium cation having a methyl group (R1) and a propyl group (R2) and a fluorohydrogenate anion are bound.

Preparing of Compound According to Experimental Example 9-3

A compound was prepared by the same method as described above in Experimental Example 9-1, so as to prepare the compound according to Experimental Example 9-3, in which an imidazolium cation having a methyl group (R1) and a butyl group (R2) and a fluorohydrogenate anion are bound.

Preparing of Compound According to Experimental Example 9-4

A compound was prepared by the same method as described above in Experimental Example 9-1, so as to prepare the compound according to Experimental Example 9-4, in which an imidazolium cation having an ethyl group (R1) and a butyl group (R2) and a fluorohydrogenate anion are bound.

Preparing of Compound According to Experimental Example 10-1

Pyrrolidinium represented by <Formula 28> below was provided as a cation, and fluorohydrogenate prepared according to Experimental Example 1-1 as described above was used as an anion, so as to prepare the compound according to Experimental Example 10-1, in which an pyrrolidinium cation having a methyl group (R1) and an ethyl group (R2) and a fluorohydrogenate anion are bound.

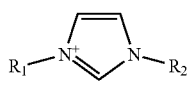

<Formula 28>

Preparing of Compound According to Experimental Example 10-2

A compound was prepared by the same method as described above in Experimental Example 10-1, so as to prepare the compound according to Experimental Example 10-2, in which a pyrrolidinium cation having a methyl group (R1) and a propyl group (R2) and a fluorohydrogenate anion are bound.

Preparing of Compound According to Experimental Example 10-3

A compound was prepared by the same method as described above in Experimental Example 10-1, so as to prepare the compound according to Experimental Example 10-3, in which a pyrrolidinium cation having a methyl group (R1) and a butyl group (R2) and a fluorohydrogenate anion are bound.

Preparing of Compound According to Experimental Example 10-4

A compound was prepared by the same method as described above in Experimental Example 10-1, so as to prepare the compound according to Experimental Example 10-4, in which a pyrrolidinium cation having an ethyl group (R1) and a butyl group (R2) and a fluorohydrogenate anion are bound.

Preparing of Compound According to Experimental Example 10-5

A compound was prepared by the same method as described above in Experimental Example 10-1, so as to prepare the compound according to Experimental Example 10-5, in which a pyrrolidinium cation having a methyl group (R1) and a methyl group (R2) and a fluorohydrogenate anion are bound.

The ion conductivity of the compounds according to Experimental Examples 1-1 to 10-5 was measured at room temperature, and the ion molecular weight of cations and the state information of the compounds according to Experimental Examples 1-1 to 10-5 are summarized as shown in <Table 1>.

TABLE 1

| Classification | Cation | Alkyl group | Ion molecular weight (g/mol) | State | Ion conductivity (mS/cm$^2$) |
|---|---|---|---|---|---|
| Experimental Example 1-1 | Thiophenium | Methyl group | 99.15 | Crystalline solid | 126 |
| Experimental Example 1-2 | | Ethyl group | 113.14 | Crystalline solid | 103 |

TABLE 1-continued

| Classification | Cation | Alkyl group | Ion molecular weight (g/mol) | State | Ion conductivity (mS/cm$^2$) |
|---|---|---|---|---|---|
| Experimental Example 1-3 | | Propyl group | 127.15 | Crystalline solid | 68 |
| Experimental Example 1-4 | | Butyl group | 142.16 | Crystalline solid | 46 |
| Experimental Example 2-1 | Thiazolium | Methyl group | 101.13 | Crystalline solid | 45 |
| Experimental Example 2-2 | | Ethyl group | 114.14 | Crystalline solid | 74 |
| Experimental Example 2-3 | | Propyl group | 126.15 | Crystalline solid | 18.9 |
| Experimental Example 2-4 | | Butyl group | 143.13 | Crystalline solid | 6.8 |
| Experimental Example 3-1 | Phospholanium | Methyl group/ Ethyl group | 130.97 | Crystalline solid | 2 |
| Experimental Example 3-2 | | Methyl group/ Propyl group | 143.1 | Crystalline solid | 35 |
| Experimental Example 3-3 | | Methyl group/ Butyl group | 159.9 | Crystalline solid | 16 |
| Experimental Example 3-4 | | Ethyl group/ Butyl group | 174 | Crystalline solid | 45 |
| Experimental Example 3-5 | | Methyl group/ Methyl group | 117 | Crystalline solid | 24 |
| Experimental Example 4-1 | Oxathiolanium | Methyl group | 106.06 | Crystalline solid | 12 |
| Experimental Example 4-2 | | Ethyl group | 120.07 | Crystalline solid | 17.5 |
| Experimental Example 4-3 | | Propyl group | 132.06 | Crystalline solid | 26.5 |
| Experimental Example 4-4 | | Butyl group | 149.06 | Crystalline solid | 21.1 |
| Experimental Example 5-1 | Ammonium | Tetraethyl group | 130.25 | Crystalline solid | 12.5 |
| Experimental Example 5-2 | | Tetrabutyl group | 242.46 | Crystalline solid | 10.1 |
| Experimental Example 5-3 | | Tetramethyl group | 59.11 | Ionic liquid | 9.4 |
| Experimental Example 5-4 | | Diethylmethyl group | 88.9 | Ionic liquid | 8.1 |
| Experimental Example 6-1 | Sulfonium | Trimethyl group | 77.04 | Ionic liquid | 8.4 |
| Experimental Example 6-2 | | Triethyl group | 119.06 | Crystalline solid | 5.6 |
| Experimental Example 7-1 | Phosphonium | Trimethyl group | 77.09 | Ionic liquid | 5.7 |
| Experimental Example 7-2 | | Triethyl group | 119.16 | Crystalline solid | 4.9 |
| Experimental Example 7-3 | | Tributyldecyl group | 343.59 | Crystalline solid | 2.8 |
| Experimental Example 8-1 | Thiazolidinium | Methyl group/ Ethyl group Methyl group/ Methyl group | 99.15 | Crystalline solid | 60 |
| Experimental Example 8-2 | | Methyl group/ Propyl group Methyl group/ Methyl group | 113.14 | Crystalline solid | 19.6 |
| Experimental Example 8-3 | | Methyl group/ Butyl group Methyl group/ Methyl group | 127.15 | Crystalline solid | 28.7 |
| Experimental Example 8-4 | | Ethyl group/ Butyl group Methyl group/ Methyl group | 142.16 | Crystalline solid | 5.8 |
| Experimental Example 9-1 | Imidazolium | Methyl group/ Ethyl group | 112.07 | Crystalline solid | 14 |
| Experimental Example 9-2 | | Methyl group/ Propyl group | 124.08 | Crystalline solid | 6.5 |
| Experimental Example 9-3 | | Methyl group/ Butyl group | 141.08 | Crystalline solid | 8.9 |
| Experimental Example 9-4 | | Ethyl group/ Butyl group | 155.07 | Crystalline solid | 2.5 |
| Experimental Example 10-1 | Pyrrolidinium | Methyl group/ Ethyl group | 115.12 | Crystalline solid | 7 |

TABLE 1-continued

| Classification | Cation | Alkyl group | Ion molecular weight (g/mol) | State | Ion conductivity (mS/cm$^2$) |
|---|---|---|---|---|---|
| Experimental Example 10-2 | | Methyl group/ Propyl group | 127.13 | Crystalline solid | 5.3 |
| Experimental Example 10-3 | | Methyl group/ Butyl group | 144.12 | Crystalline solid | 14.5 |
| Experimental Example 10-4 | | Ethyl group/ Butyl group | 158.12 | Crystalline solid | 20 |
| Experimental Example 10-5 | | Methyl group/ Methyl group | 101.13 | Crystalline solid | 0.9 |

As can be understood from <Table 1>, it can be confirmed that compounds have a high ion conductivity, if thiophenium is included as a cation (Experimental Examples 1-1 to 1-4), if thiazolium having a methyl group, an ethyl group, or a propyl group is included (Experimental Examples 2-1 to 2-3), if phospholanium having a methyl group/propyl group, a methyl group/butyl group, an ethyl group/butyl group, or a methyl group/methyl group is included (Experimental Examples 3-2 to 3-5), if oxathiolanium having an ethyl group, a propyl group, or a butyl group is included (Experimental Examples 4-2 to 4-4), and if a thiazolidinium having a methyl group/ethyl group, a methyl group/propyl group, and a methyl group/butyl group is included (Experimental Examples 8-1 to 8-3).

Thiophenium having a methyl group identified as having the highest ion conductivity in <Table 1> was fixed as a cation and a type of anion was varied to prepare a compound for a solid electrolyte according to Experimental Examples 11-1 to 11-18.

Preparing of Compound According to Experimental Example 11-1

Chlorine ion was provided as an anion so as to prepare a compound according to Experimental Example 11-1 in which a thiophenium cation having a methyl group according to Experimental Example 1-1 as described above and a chlorine anion are bound.

Preparing of Compound According to Experimental Example 11-2

Cyanate was provided as an anion so as to prepare a compound according to Experimental Example 11-2 in which a thiophenium cation having a methyl group according to Experimental Example 1-1 as described above and a cyanate anion are bound.

Preparing of Compound According to Experimental Example 11-3

Oxohydrogenate was provided as an anion so as to prepare a compound according to Experimental Example 11-3 in which a thiophenium cation having a methyl group according to Experimental Example 1-1 as described above and an oxohydrogenate anion are bound.

Preparing of Compound According to Experimental Example 11-4

SCN was provided as an anion so as to prepare a compound according to Experimental Example 11-4 in which a thiophenium cation having a methyl group according to Experimental Example 1-1 as described above and an SCN anion are bound.

Preparing of Compound According to Experimental Example 11-5

Nitrogen was provided as an anion so as to prepare a compound according to Experimental Example 11-5 in which a thiophenium cation having a methyl group according to Experimental Example 1-1 as described above and a nitrogen anion are bound.

Preparing of Compound According to Experimental Example 11-6

N(CN)$_2$ was provided as an anion so as to prepare a compound according to Experimental Example 11-6 in which a thiophenium cation having a methyl group according to Experimental Example 1-1 as described above and an N(CN)$_2$ anion are bound.

Preparing of Compound According to Experimental Example 11-7

Cyano(nitroso)methanide was provided as an anion so as to prepare a compound according to Experimental Example 11-7 in which a thiophenium cation having a methyl group according to Experimental Example 1-1 as described above and a cyano(nitroso)methanide anion are bound.

Preparing of Compound According to Experimental Example 11-8

Tetrazolidine was provided as an anion so as to prepare a compound according to Experimental Example 11-8 in which a thiophenium cation having a methyl group according to Experimental Example 1-1 as described above and a tetrazolidine anion are bound.

Preparing of Compound According to Experimental Example 11-9

Bromine was provided as an anion so as to prepare a compound according to Experimental Example 11-9 in which a thiophenium cation having a methyl group according to Experimental Example 1-1 as described above and a bromine anion are bound.

Preparing of Compound According to Experimental Example 11-10

BF$_4$ was provided as an anion so as to prepare a compound according to Experimental Example 11-10 in which a thiophenium cation having a methyl group according to Experimental Example 1-1 as described above and a BF$_4$ anion are bound.

Preparing of Compound According to Experimental Example 11-11

Dihydrogen phosphate was provided as an anion so as to prepare a compound according to Experimental Example 11-11 in which a thiophenium cation having a methyl group according to Experimental Example 1-1 as described above and a dihydrogen phosphate anion are bound.

Preparing of Compound According to Experimental Example 11-12

Hydrogensulfate was provided as an anion so as to prepare a compound according to Experimental Example 11-12 in which a thiophenium cation having a methyl group according to Experimental Example 1-1 as described above and a hydrogensulfate anion are bound.

Preparing of Compound According to Experimental Example 11-13

Dimethyl phosphate was provided as an anion so as to prepare a compound according to Experimental Example 11-13 in which a thiophenium cation having a methyl group according to Experimental Example 1-1 as described above and a dimethyl phosphate anion are bound.

Preparing of Compound According to Experimental Example 11-14

Iodine was provided as an anion so as to prepare a compound according to Experimental Example 11-14 in which a thiophenium cation having a methyl group according to Experimental Example 1-1 as described above and an iodine anion are bound.

Preparing of Compound According to Experimental Example 11-15

$PF_6$ was provided as an anion so as to prepare a compound according to Experimental Example 11-15 in which a thiophenium cation having a methyl group according to Experimental Example 1-1 as described above and a $PF_6$ anion are bound.

Preparing of Compound According to Experimental Example 11-16

Trifluoromethanesulfonate was provided as an anion so as to prepare a compound according to Experimental Example 11-16 in which a thiophenium cation having a methyl group according to Experimental Example 1-1 as described above and a trifluoromethanesulfonate anion are bound.

Preparing of Compound According to Experimental Example 11-17

FSI was provided as an anion so as to prepare a compound according to Experimental Example 11-17 in which a thiophenium cation having a methyl group according to Experimental Example 1-1 as described above and an FSI anion are bound.

Preparing of Compound According to Experimental Example 11-18

TFSI was provided as an anion so as to prepare a compound according to Experimental Example 11-18 in which a thiophenium cation having a methyl group according to Experimental Example 1-1 as described above and a TFSI anion are bound.

The ion conductivity of the compounds according to Experimental Examples 11-11 to 11-17 was measured at room temperature, and the molecular weight of anions, the state information of the compounds according to Experimental Examples 11-1 to 11-17, pH of anions, and an entropy of fusion of the compounds according to Experimental Examples 11-1 to 11-17 are summarized as shown in <Table 2>.

TABLE 2

| Classification | Anion | Ion Molecular weight (g/mol) | State | Ion conductivity (mS/cm$^2$) | pH | Entropy of fusion (J/Kmol) |
|---|---|---|---|---|---|---|
| Experimental Example 11-1 | Chlorine | 35.45 | Ionic liquid | 3.6 | More than 3 | 9.3 |
| Experimental Example 11-2 | Cyanate | 42 | Ionic liquid | 4.3 | | 8.1 |
| Experimental Example 11-3 | Oxohydrogenate | 48 | Ionic liquid | 5.8 | | 7.6 |
| Experimental Example 11-4 | SCN | 58.08 | Ionic liquid | 3.9 | | 6.4 |
| Experimental Example 11-5 | Nitrogen | 62 | Crystalline solid | 4.1 | Less than 3 | 36 |
| Experimental Example 1-1 | Fluorohydrogenate | 63 | Crystalline solid | 126 | | 23.6 |
| Experimental Example 11-6 | N(CN)$_2$ | 66 | Crystalline solid | 3.6 | | 36 |
| Experimental Example 11-7 | Cyano(nitro)methanide | 69 | Crystalline solid | 48.6 | | 24.9 |
| Experimental Example 11-8 | Tetrazolidine | 72 | Crystalline solid | 69.4 | | 24.3 |
| Experimental Example 11-9 | Bromine | 79.90 | Crystalline solid | 2.6 | | 35.6 |
| Experimental Example 11-10 | BF$_4$ | 86.81 | Crystalline solid | 6.9 | | 38.1 |
| Experimental Example 11-11 | Dihydrogen phosphate | 96.98 | Crystalline solid | 3.3 | | 43.2 |
| Experimental Example 11-12 | Hydrogen sulfate | 97.07 | Crystalline solid | 16.9 | | 47.6 |
| Experimental Example 11-13 | Dimethyl phosphate | 126.05 | Crystalline solid | 8.1 | | 49.3 |
| Experimental Example 11-14 | Iodine | 126.9 | Crystalline solid | 5.1 | | 45.2 |
| Experimental Example 11-15 | PF$_6$ | 145 | Crystalline solid | 23 | | 39.8 |
| Experimental Example 11-16 | Trifluoromethanesulfonate | 164.1 | Crystalline solid | 12.6 | | 42.8 |
| Experimental Example 11-17 | FSI | 180.13 | Crystalline solid | 35 | | 41.7 |
| Experimental Example 11-18 | TFSI | 280.135 | Crystalline solid | 29 | | 46.9 |

As can be understood from <Table 2>, it can be confirmed that compounds have a high ion conductivity, if fluorohydrogenate is included as an anion (Experimental Example 1-1), if cyano(nitroso)methanide is included (Experimental Example 11-7), and if tetrazolidine is included (Experimental Examples 11-8). In addition, if a molecular weight of the anion is 60 g/mol % or less (more specifically, 58.08 g/mol % or less), and if a pH of the anion is greater than 3, it can be confirmed that a compound in which a cation and an anion are bound is not a crystalline solid but an ionic liquid. In other words, if a molecular weight of the anion is more than 60 g/mol (more specifically, 62 g/mol % or less), and if a pH of the anion is less than 3, it can be confirmed that a compound in which a cation and an anion are bound is maintained as a crystalline solid.

In addition, if a molecular weight of the anion is more than 60 g/mol (more specifically, 62 g/mol % or more), and if a pH of the anion is less than 3 and an entropy of fusion is 15-25 J/Kmol (more specifically, more than 9.3 J/Kmol and less than 35.6 J/Kmol), it can be confirmed that a compound has a high ion conductivity.

Preparing of Solid Electrolyte According to Experimental Example 12-1

A 1M hydrofluoric acid aqueous solution and lithium chloride (LiCl) were added into a container and left alone at a temperature of −70° C. for 24 hours, so as to prepare lithium fluorohydrogenate.

A compound having a methyl group according to Experimental Example 1-1 described above was heated to 60° C. and lithium fluorohydrogenate was added in an amount of 1 mol % at the same time and reacted for two hours, so as to prepare a solid electrolyte according to Experimental Example 12-1.

Preparing of Solid Electrolyte According to Experimental Example 12-2

A solid electrolyte was prepared by the same method as described above in Experimental Example 12-1. However, lithium fluorohydrogenate was added in an amount of 5 mol % instead of 1 mol %, so as to prepare a solid electrolyte according to Experimental Example 12-2.

Preparing of Solid Electrolyte According to Experimental Example 12-3

A solid electrolyte was prepared by the same method as described above in Experimental Example 2-1. However, lithium fluorohydrogenate was added in an amount of 10 mol % instead of 1 mol %, so as to prepare a solid electrolyte according to Experimental Example 12-3.

FIG. 1 is a graph showing an ion conductivity of compounds according to Experimental Examples 1-1, 11-7, 11-8, 11-15, 11-17 and 11-18 of the present application as measured depending on a temperature.

Referring to FIG. 1, an ion conductivity of compounds according to Experimental Examples 1-1, 11-7, 11-8, 11-15, 11-17 and 11-18 of the present application was measured depending on a temperature.

As can be understood from FIG. 1, it may be confirmed that a compound has the highest ion conductivity, in case of including fluorohydrogenate as an anion according to Experimental Example 1-1, and it can be confirmed that a compound has the highest ion conductivity, in case of including cyano(nitro)methanide and tetrazolidine as an anion according to Experimental Examples 11-7 and 11-8.

FIG. 2 is a differential scanning calorimetry (DSC) graph showing a compound according to Experimental Example 1-1 and a solid electrolyte according to Experimental Example 12-3 of the present application.

Referring to FIG. 2, a solid-liquid or solid-solid state change depending on a temperature may be observed in the compound according to Experimental Example 1-1 and the solid electrolyte according to Experimental Example 12-3.

As shown in FIG. 2, a solid-liquid state change was observed at 90° C. in the compound of Experimental Example 1-1. In contrast, a solid-liquid state change was observed at 70° C. in the solid electrolyte of Experimental Example 12-3.

In addition, a solid-solid state change was observed twice in the compound of Experimental Example 1-1, and specifically it can be seen that the compound of Experimental Example 1-1 has a first crystal phase in a temperature range of 28 to 90° C. and a second crystal phase in a temperature range of 22 to 28° C. In contrast, a solid-solid state change was observed once in the solid electrolyte of Experimental Example 12-3, and it can be confirmed that the solid electrolyte has one crystal phase in a temperature range of 22 to 70° C.

FIG. 3 is a DSC graph showing a compound according to Experimental Examples 11-7 and 11-8 of the present application.

Referring to FIG. 3, a state change of compounds according to Experimental Examples 11-7 and 11-8 was observed depending on a temperature.

As can be understood from FIG. 3, it can be confirmed that the compounds according to Experimental Examples 11-7 and 11-8 stably maintain a solid crystal phase in a relatively wide range of temperatures. Specifically, it can be confirmed that the compound according to Experimental Example 11-7 and the compound according to Experimental Example 11-8 stably maintain a solid crystal phase −15 to 98° C. and at −59 to 129° C., respectively. In addition, the compounds according to Experimental Examples 11-7 and 11-8 have a somewhat low ion conductivity compared to the compound according to Experimental Example 1-1, but stably maintain a crystal phase in a range of temperatures wider than the range of temperatures (28 to 90° C.) in which the compound according to Experimental Example 1-1 stably maintains a first crystal phase as shown in FIG. 2. Accordingly, the compounds according to Experimental Examples 11-7 and 11-8 can be useful in military or space fields, or low-temperature environments such as a polar region.

FIGS. 4 and 5 are graphs showing an X-ray diffraction (XRD) pattern of a compound according to Experimental Example 1-1 of the present application depending on a temperature.

Referring to FIGS. 4 and 5, an XRD pattern of a compound according to Experimental Example 1-1 depending on a temperature was measured in the range of −50 to 80° C.

As can be understood from FIGS. 4 and 5, it can be confirmed that a main peak moves to the left as a temperature increases in the area of 20 to 80° C., and a peak corresponding to 2θ 53.6° and 85.4° disappears at a temperature of 70° C. or higher.

In addition, as a temperature increases, it can be observed that one peak changes to two peaks, and it can be understood that a peak intensity value decreases. In other words, as the temperature increases, it can be confirmed that a short range disordered amorphous crystal structure increases and thus sequentially changes to phase III (−50 to 25° C.), phase II (25 to 30° C.), and phase I (30° C. or higher) as shown in FIG. 5, and phase III, phase II, and phase I of FIG. 5 correspond to solid phase III, phase II, and phase I of FIG. 2, respectively.

FIG. 6 is a graph showing an NMR analysis result of a solid electrolyte according to Experimental Example 12-1 of the present application.

Referring to FIG. 6, an NMR analysis was performed for a solid electrolyte according to Experimental Example 12-1. (a) of FIG. 6 may be $6^1$H NMR spectra, (b) of FIG. 6 may be $8^{19}$ F NMR spectra, and (c) of FIG. 6 may be $7^7$ Li NMR spectra.

It can be confirmed from (a), (b), and (c) of FIG. 6 that lithium is doped onto the compound in which a cation and an anion are bound through lithium fluorohydrogenate.

FIG. 7 is a graph showing a chemical shift and a diffusion coefficient of a solid electrolyte according to Experimental Example 12-1 of the present application as measured depending on a temperature.

Referring to FIG. 7, a chemical shift of Li, H, and F of the solid electrolyte according to Experimental Example 12-1 was measured depending on a temperature, and a diffusion coefficient of Li ions, cations, and anions of the solid electrolyte according to Experimental Example 12-1 was measured.

As can be understood from FIG. 7, a diffusion coefficient of Li ions of the solid electrolyte of Experimental Example 12-1 was measured to be $10^{-8}$ to $10^{-9}$ m$^2$s$^{-1}$, which is generally at a remarkably high level compared to the solid electrolyte in which a cation and an anion are bound.

FIG. 8 is a graph showing an XRD pattern of a compound according to Experimental Example 1-1 and a solid electrolyte according to Experimental Example 12-2 of the present application.

Referring to FIG. 8, a change in a crystal structure of the solid electrolyte according to Experimental Example 12-2 may be observed compared to the compound according to Experimental Example 1-1.

As shown in FIG. 8, it was confirmed that the compound of Experimental Example 1-1 and the solid electrolyte of Experimental Example 12-2 have the same position of main peaks. In contrast, different peak intensities were observed, and it can be seen that the solid electrolyte of Experimental Example 12-2 further includes a lithium-rich phase.

FIG. 9 is a view for explaining a crystal structure of a solid electrolyte according to Experimental Examples 12-1 to 12-3 of the present application.

Referring to FIG. 9, the solid electrolytes according to Experimental Examples 12-1 to 12-3 may include a thiophenium cation, a fluorohydrogenate anion and lithium salt.

A unit cell of the compound in which a thiophenium cation and a fluorohydrogenate anion are bound may have an orthorhombic crystal structure, in which the thiophenium cation may be provided at a vertex of the crystal structure and at a center of a face thereof, and the fluorohydrogenate anion may be provided in a middle of an edge of the crystal structure. In this case, the solid electrolyte of Experimental Examples 12-1 to 12-3 may have the lithium salt optionally provided at interstitial sites of the crystal structure. Specifically, the lithium salt may include lithium fluorohydrogenate.

The lithium salt may be provided at the interstitial sites of the crystal structure of the compound, and thus may easily move within the crystal structure. Accordingly, an ion conductivity may increase as an addition amount of the lithium fluorohydrogenate, which is lithium salt, increases.

FIG. 10 is a graph showing an ion conductivity of a compound according to Experimental Example 1-1 and a solid electrolyte according to Experimental Examples 12-1 to 12-3 of the present application depending on a temperature.

Referring to FIG. 10, a lithium ion conductivity was measured with regard to a compound according to Experimental Example 1-1 and a solid electrolyte according to Experimental Examples 12-1 to 12-3. As described above with reference to FIG. 9, lithium fluorohydrogenate may be optionally provided at interstitial sites in the crystal structure of the compound of the solid electrolyte of Experimental Examples 12-1 to 12-3. Accordingly, it was observed that lithium fluorohydrogenate may easily move within the crystal structure, and thus, when an addition amount of lithium fluorohydrogenate is increased, an ion conductivity becomes higher.

In this case, lithium fluorohydrogenate may move to interstitial sites in the crystal structure where lithium fluorohydrogenate is not provided, and may exhibit a high ion conductivity. Thus, as the interstitial sites provided with lithium fluorohydrogenate increase, a rate of increase in ion conductivity may reach saturation. In other words, as shown in FIG. 10, it can be confirmed that the ion conductivity substantially reaches saturation, if an addition amount of the lithium fluorohydrogenate is 5 mol % or more.

FIG. 11 is a picture of a electrolyte membrane coated with a solid electrolyte according to Experimental Example 12-1 of the present application.

Referring to FIG. 11, a picture was taken of a solid electrolyte membrane in the form of a film in which a solid electrolyte according to Experimental Example 12-1 of the present application is coated on a polytetrafluoroethylene (PTFE) resin. In this case, it was confirmed that the solid electrolyte membrane maintains the softness and transparency of the resin.

FIGS. 12 and 13 are graphs showing results of a cycle test of a secondary battery including a solid electrolyte according to Experimental Example 12-2 of the present application.

Referring to FIGS. 12 and 13, a secondary battery was manufactured by using the solid electrolyte according to Experimental Example 12-2 of the present application, LiFePO$_4$ as the positive electrode, and lithium metal as the negative electrode, and charge/discharge properties were evaluated.

Charge and discharge were performed at a rate of 1 C, and the secondary battery showed a coulombic efficiency of 99.5% and a capacity of 158.6 mAh/g. In a 250th cycle, it can be confirmed that the secondary battery showed a coulomb efficiency of 98% and a capacity of 155.5 mAh/g. It can be confirmed that a secondary battery having a long life, high stability and high reliability may be implemented by using the solid electrolyte according to the implementation of the present application.

FIG. 14 is a graph showing a capacity retention rate depending on a charge/discharge rate of a secondary battery including a solid electrolyte according to Experimental Example 12-2 of the present application.

Referring to FIG. 14, charge/discharge was performed at a rate of 0.1 to 5 C for the secondary battery manufactured with reference to FIGS. 12 to 13. Specifically, a charge/discharge rate of the secondary battery increased to 0.1 to 5 C, and again decreased to 1 C. If the charge/discharge rate was 0.1, 0.5, 1, 2, 3 and 5 C, a discharge capacity was measured to be 161.0, 160.5, 158.6, 156.4, 153.8 and 148.9 mAh/g, respectively.

In other words, it can be confirmed that a secondary battery stably operable in a high-speed charge/discharge condition may be implemented by using the solid electrolyte according to the implementation of the present application.

FIG. 15 is a graph showing an impedance depending on a cycle test of a secondary battery including a solid electrolyte according to Experimental Example 12-2 of the present application.

Referring to FIG. 15, in the secondary battery manufactured with reference to FIGS. 12 and 13, an interphase impedance ($R_{SEI}$) and an electron transfer impedance ($R_{CT}$) in the first cycle and the 250th cycle was measured. The interphase impedance and the electron transfer impedance in the first cycle were calculated to be 1.65 and 11.22Ω), respectively. In addition, the interphase impedance and the electron transfer impedance in the 250th cycle were calculated to be 1.75 and 11.65Ω), respectively. In the secondary battery, as the number of charge/discharge cycles increases, elements included in the components of the secondary battery may be subject to movement and diffusion. Accordingly, resistance in the secondary battery may increase, and charge/discharge properties of the secondary battery may decrease. However, it was observed that the secondary battery including the solid electrolyte according to an embodiment of the present application shows a relatively low increase in the impedance in the 250th cycle. Thus, it can be confirmed that the secondary battery including the solid electrolyte according to an embodiment of the present application has excellent chemical stability.

Although the present application has been described in detail with reference to exemplary embodiments, the scope of the present application is not limited to a specific embodiment and should be interpreted by the attached claims. In addition, those skilled in the art should understand that many modifications and variations are possible without departing from the scope of the present application.

INDUSTRIAL APPLICABILITY

The solid electrolyte according to an embodiment of the present application may be used as an electrolyte for a secondary battery, a super capacitor or the like.

The invention claimed is:

1. An intermediate product of a solid electrolyte, the intermediate product comprising:
   a compound in which a cation including thiophenium or thiazolium and an anion including fluorohydrogenate are bound; and
   a solvent in which the compound is mixed.

2. The intermediate product of the solid electrolyte of claim 1, wherein the intermediate product of the solid electrolyte including the compound and the solvent is in a liquid or gel state.

3. The intermediate product of the solid electrolyte of claim 1, wherein the solvent comprises at least any one of acetonitrile, tetrahydrofuran, DMSO, or DMF.

4. The intermediate product of the solid electrolyte of claim 1, wherein
   the cation comprises the thiophenium, and
   the compound comprises a methyl group bonded with a sulfur element of the thiophenium.

5. The intermediate product of the solid electrolyte of claim 1, wherein
   the cation comprises the thiazolium, and
   the compound comprises an ethyl group bonded with a nitrogen element of the thiazolium.

6. A method for preparing a solid electrolyte, the method comprising:
   preparing the intermediate product of the solid electrolyte according to claim 1; and
   removing and drying the solvent included in the intermediate product of the solid electrolyte to prepare the solid electrolyte.

7. A secondary battery comprising:
   a positive electrode;
   a solid electrolyte disposed on the positive electrode and prepared according to claim 6; and
   a negative electrode disposed on the solid electrolyte.

8. The secondary battery of claim 7, wherein
   a positive electrode active material of the positive electrode comprises lithium, phosphorus, and iron, and
   a negative electrode active material of the negative electrode comprises lithium.

* * * * *